US008509400B2

(12) United States Patent
Liu et al.

(10) Patent No.: US 8,509,400 B2
(45) Date of Patent: Aug. 13, 2013

(54) SYSTEM AND METHOD FOR ADAPTIVE PROGRAMMING OF A REMOTE CONTROL

(75) Inventors: Godwin Liu, Burlington (CA); Mark Rigley, Toronto (CA); Stephen Wheeler, Ottawa (CA); Justin M. Henry, Mississauga (CA); Glen McLean Harris, Auckland (NZ)

(73) Assignee: Logitech Europe S.A., Morges (CH)

( * ) Notice: Subject to any disclaimer, the term of this patent is extended or adjusted under 35 U.S.C. 154(b) by 1899 days.

(21) Appl. No.: 11/408,440

(22) Filed: Apr. 20, 2006

(65) Prior Publication Data
US 2007/0037522 A1 Feb. 15, 2007

Related U.S. Application Data

(60) Provisional application No. 60/673,479, filed on Apr. 20, 2005.

(51) Int. Cl.
*H04B 1/00* (2006.01)

(52) U.S. Cl.
USPC .............. 379/90.01; 379/102.01; 379/102.03; 379/110.01; 340/539.1; 340/815.4

(58) Field of Classification Search
USPC .............. 379/90.01, 102.01, 102.03, 102.04, 379/110.01; 725/100, 114, 131.39; 340/539.1, 340/815.4, 825.22, 825.37, 826.69; 455/68; 323/371
See application file for complete search history.

(56) References Cited

U.S. PATENT DOCUMENTS

| | | | |
|---|---|---|---|
| 3,597,531 A | 8/1971 | De Marinis et al. |
| 3,990,012 A | 11/1976 | Karnes |
| 4,174,517 A | 11/1979 | Mandel |
| 4,231,031 A | 10/1980 | Crowther et al. |
| 4,287,676 A | 9/1981 | Weinhaus |
| 4,377,870 A | 3/1983 | Anderson et al. |
| 4,392,022 A | 7/1983 | Carlson |
| 4,394,691 A | 7/1983 | Amano et al. |

(Continued)

FOREIGN PATENT DOCUMENTS

| | | |
|---|---|---|
| AU | 66267/90 | 4/1992 |
| AU | 2001169851 A1 | 1/2002 |

(Continued)

OTHER PUBLICATIONS

U.S. Appl. No. 12/245,675, filed Oct. 3, 2008, Harris et al.

(Continued)

*Primary Examiner* — Melur Ramakrishnaiah
(74) *Attorney, Agent, or Firm* — Kilpatrick Townsend & Stockton LLP

(57) ABSTRACT

A method and system for adaptively configuring a remote control includes analyzing a log of events, maintained by the remote control, which indicate how the remote control and the devices it controls are used by a user. Once the analysis is performed, the system and method can suggest alternative configurations of the remote control to the user. The range and type of alternative configurations is not particularly limited and can include changing which devices are employed for various user activities and/or how those activities are performed, the placement and hierarchy of commands in a menu tree and/or troubleshooting and set up configurations. The analysis can be performed either partially or totally within the remote control, or at, or in conjunction with, a service to which the remote control connects through a network.

40 Claims, 7 Drawing Sheets

(56) References Cited

U.S. PATENT DOCUMENTS

| | | |
|---|---|---|
| 4,475,123 A | 10/1984 | Dumbauld et al. |
| 4,488,179 A | 12/1984 | Kruger et al. |
| 4,566,034 A | 1/1986 | Harger et al. |
| 4,567,512 A | 1/1986 | Abraham |
| 4,592,546 A | 6/1986 | Fascenda et al. |
| 4,623,887 A | 11/1986 | Welles, II |
| 4,626,848 A | 12/1986 | Ehlers |
| 4,703,359 A | 10/1987 | Rumbolt et al. |
| 4,706,121 A | 11/1987 | Young |
| 4,712,105 A | 12/1987 | Kohler |
| 4,728,949 A | 3/1988 | Platte et al. |
| 4,746,919 A | 5/1988 | Reitmeier |
| 4,774,511 A | 9/1988 | Rumbolt et al. |
| 4,792,972 A | 12/1988 | Cook, Jr. |
| 4,807,031 A | 2/1989 | Broughton et al. |
| 4,825,200 A | 4/1989 | Evans et al. |
| 4,825,209 A | 4/1989 | Sasaki et al. |
| 4,837,627 A | 6/1989 | Mengel |
| 4,845,491 A | 7/1989 | Fascenda et al. |
| 4,857,898 A | 8/1989 | Smith |
| 4,866,434 A | 9/1989 | Keenan |
| 4,876,592 A | 10/1989 | Von Kohorn |
| 4,888,709 A | 12/1989 | Revesz et al. |
| 4,899,370 A | 2/1990 | Kameo et al. |
| 4,918,439 A | 4/1990 | Wozniak et al. |
| 4,941,090 A | 7/1990 | McCarthy |
| 4,959,719 A | 9/1990 | Strubbe et al. |
| 4,959,810 A | 9/1990 | Darbee et al. |
| RE33,369 E | 10/1990 | Hashimoto |
| 4,962,466 A | 10/1990 | Revesz et al. |
| 4,989,081 A | 1/1991 | Miyagawa et al. |
| 4,999,622 A | 3/1991 | Amano et al. |
| 5,001,554 A | 3/1991 | Johnson et al. |
| 5,016,272 A | 5/1991 | Stubbs et al. |
| 5,033,079 A | 7/1991 | Catron et al. |
| 5,046,093 A | 9/1991 | Wachob |
| 5,065,235 A | 11/1991 | Iijima |
| 5,065,251 A | 11/1991 | Shuhart, Jr. et al. |
| 5,089,885 A | 2/1992 | Clark |
| 5,097,249 A | 3/1992 | Yamamoto |
| 5,109,222 A | 4/1992 | Welty |
| 5,115,236 A | 5/1992 | Kohler |
| 5,117,355 A | 5/1992 | McCarthy |
| 5,128,752 A | 7/1992 | Von Kohorn |
| 5,132,679 A | 7/1992 | Kubo et al. |
| 5,140,326 A | 8/1992 | Bacrania et al. |
| 5,151,789 A | 9/1992 | Young |
| 5,161,023 A | 11/1992 | Keenan |
| 5,177,461 A | 1/1993 | Budzyna et al. |
| 5,202,826 A | 4/1993 | McCarthy |
| 5,204,768 A | 4/1993 | Tsakiris et al. |
| 5,206,722 A | 4/1993 | Kwan |
| 5,220,420 A | 6/1993 | Hoarty et al. |
| 5,228,077 A | 7/1993 | Darbee |
| 5,237,327 A | 8/1993 | Saitoh et al. |
| 5,249,044 A | 9/1993 | Von Kohorn |
| 5,251,048 A | 10/1993 | Doane et al. |
| 5,255,313 A | 10/1993 | Darbee |
| 5,272,418 A | 12/1993 | Howe et al. |
| 5,282,028 A | 1/1994 | Johnson et al. |
| 5,285,278 A | 2/1994 | Holman |
| 5,287,181 A | 2/1994 | Holman |
| 5,287,268 A | 2/1994 | McCarthy |
| 5,297,204 A | 3/1994 | Levine |
| 5,341,166 A | 8/1994 | Garr et al. |
| 5,353,121 A | 10/1994 | Young et al. |
| 5,355,480 A | 10/1994 | Smith et al. |
| 5,367,316 A | 11/1994 | Ikezaki |
| 5,374,999 A | 12/1994 | Chuang et al. |
| 5,381,991 A | 1/1995 | Stocker |
| 5,382,947 A | 1/1995 | Thaler et al. |
| 5,404,393 A | 4/1995 | Remillard |
| 5,406,558 A | 4/1995 | Rovira et al. |
| 5,410,326 A | 4/1995 | Goldstein |
| 5,414,426 A | 5/1995 | O'Donnell et al. |
| 5,414,761 A | 5/1995 | Darbee |
| 5,416,535 A | 5/1995 | Sato et al. |
| 5,418,424 A | 5/1995 | Aprile et al. |
| 5,422,783 A | 6/1995 | Darbee |
| 5,446,551 A | 8/1995 | Kawaguchi et al. |
| 5,450,079 A | 9/1995 | Dunaway |
| 5,455,570 A | 10/1995 | Cook et al. |
| 5,461,667 A | 10/1995 | Remillard |
| 5,479,266 A | 12/1995 | Young et al. |
| 5,479,268 A | 12/1995 | Young et al. |
| 5,481,251 A | 1/1996 | Buys et al. |
| 5,481,256 A | 1/1996 | Darbee et al. |
| 5,483,276 A | 1/1996 | Brooks et al. |
| 5,497,185 A | 3/1996 | Dufresne et al. |
| 5,500,681 A | 3/1996 | Jones |
| 5,500,794 A | 3/1996 | Fujita et al. |
| 5,502,504 A | 3/1996 | Marshall et al. |
| 5,504,475 A | 4/1996 | Houdou et al. |
| 5,510,828 A | 4/1996 | Lutterbach et al. |
| 5,515,052 A | 5/1996 | Darbee |
| 5,515,106 A | 5/1996 | Chaney et al. |
| 5,515,270 A | 5/1996 | Weinblatt |
| 5,517,254 A | 5/1996 | Monta et al. |
| 5,523,794 A | 6/1996 | Mankovitz et al. |
| 5,523,796 A | 6/1996 | Marshall et al. |
| 5,524,141 A | 6/1996 | Braun et al. |
| 5,524,195 A | 6/1996 | Clanton, III et al. |
| 5,528,304 A | 6/1996 | Cherrick et al. |
| 5,532,689 A | 7/1996 | Bueno |
| 5,532,732 A | 7/1996 | Yuen et al. |
| 5,532,754 A | 7/1996 | Young et al. |
| 5,537,106 A | 7/1996 | Mitsuhashi |
| 5,537,107 A | 7/1996 | Funado |
| 5,537,463 A | 7/1996 | Escobosa et al. |
| 5,539,393 A | 7/1996 | Barfod |
| 5,550,576 A | 8/1996 | Klosterman |
| 5,552,837 A | 9/1996 | Mankovitz |
| 5,552,917 A | 9/1996 | Darbee et al. |
| 5,557,338 A | 9/1996 | Maze et al. |
| 5,557,721 A | 9/1996 | Fite et al. |
| 5,559,548 A | 9/1996 | Davis et al. |
| 5,566,353 A | 10/1996 | Cho et al. |
| 5,568,367 A | 10/1996 | Park |
| 5,576,755 A | 11/1996 | Davis et al. |
| 5,576,768 A | 11/1996 | Gomikawa |
| 5,579,055 A | 11/1996 | Hamilton et al. |
| 5,579,221 A | 11/1996 | Mun |
| 5,583,491 A | 12/1996 | Kim |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,596,373 A | 1/1997 | White et al. |
| 5,600,573 A | 2/1997 | Hendricks et al. |
| 5,603,078 A | 2/1997 | Henderson et al. |
| 5,604,923 A | 2/1997 | Wilkus |
| 5,614,906 A | 3/1997 | Hayes et al. |
| 5,619,196 A | 4/1997 | Escobosa |
| 5,619,251 A | 4/1997 | Kuroiwa et al. |
| 5,625,608 A | 4/1997 | Grewe et al. |
| 5,627,567 A | 5/1997 | Davidson |
| 5,629,733 A | 5/1997 | Youman et al. |
| 5,629,868 A | 5/1997 | Tessier et al. |
| 5,631,652 A | 5/1997 | Lee |
| 5,638,050 A | 6/1997 | Sacca et al. |
| 5,638,113 A | 6/1997 | Lappington et al. |
| 5,646,608 A | 7/1997 | Shintani |
| 5,650,831 A | 7/1997 | Farwell |
| 5,663,757 A | 9/1997 | Morales |
| 5,671,267 A | 9/1997 | August et al. |
| 5,677,711 A | 10/1997 | Kuo |
| 5,684,526 A | 11/1997 | Yoshinobu |
| 5,686,891 A | 11/1997 | Sacca et al. |
| 5,689,353 A | 11/1997 | Darbee et al. |
| 5,695,400 A | 12/1997 | Fennell, Jr. et al. |
| 5,710,601 A | 1/1998 | Marshall et al. |
| 5,710,605 A | 1/1998 | Nelson |
| 5,734,838 A | 3/1998 | Robinson et al. |
| 5,761,601 A | 6/1998 | Nemirofsky et al. |

| | | | | | | |
|---|---|---|---|---|---|---|
| 5,768,680 | A | 6/1998 | Thomas | 6,522,262 B1 | 2/2003 | Hayes et al. |
| 5,774,172 | A | 6/1998 | Kapell et al. | 6,532,592 B1 | 3/2003 | Shintani et al. |
| 5,778,256 | A | 7/1998 | Darbee | 6,538,556 B1 | 3/2003 | Kawajiri |
| 5,781,894 | A | 7/1998 | Petrecca et al. | 6,563,430 B1 | 5/2003 | Kemink et al. |
| 5,786,814 | A | 7/1998 | Moran et al. | 6,567,011 B1 | 5/2003 | Young et al. |
| 5,794,210 | A | 8/1998 | Goldhaber et al. | 6,567,984 B1 | 5/2003 | Allport |
| 5,796,832 | A | 8/1998 | Kawan | 6,587,067 B2 | 7/2003 | Darbee et al. |
| 5,800,268 | A | 9/1998 | Molnick | 6,628,340 B1 | 9/2003 | Graczyk et al. |
| 5,806,065 | A | 9/1998 | Lomet | 6,629,077 B1 | 9/2003 | Arling et al. |
| 5,815,086 | A | 9/1998 | Ivie et al. | 6,640,144 B1 | 10/2003 | Huang et al. |
| 5,819,034 | A | 10/1998 | Joseph et al. | 6,642,852 B2 | 11/2003 | Dresti et al. |
| 5,819,294 | A | 10/1998 | Chambers et al. | 6,650,247 B1 | 11/2003 | Hayes |
| 5,822,123 | A | 10/1998 | Davis et al. | 6,657,679 B2 | 12/2003 | Hayes et al. |
| 5,828,318 | A | 10/1998 | Cesar et al. | 6,690,290 B2 | 2/2004 | Young et al. |
| 5,828,945 | A | 10/1998 | Klosterman | 6,690,392 B1 | 2/2004 | Wugoski |
| 5,850,249 | A | 12/1998 | Massetti et al. | 6,701,091 B2 | 3/2004 | Escobosa et al. |
| 5,855,008 | A | 12/1998 | Goldhaber et al. | 6,720,904 B1 | 4/2004 | Darbee |
| 5,870,030 | A | 2/1999 | Deluca et al. | 6,722,984 B1 | 4/2004 | Sweeney, Jr. et al. |
| 5,870,683 | A | 2/1999 | Wells | 6,724,339 B2 | 4/2004 | Conway et al. |
| RE36,119 | E | 3/1999 | Kunishima et al. | 6,747,591 B1 | 6/2004 | Lilleness et al. |
| 5,883,680 | A | 3/1999 | Nykerk | 6,748,248 B1 | 6/2004 | Pan et al. |
| 5,886,691 | A | 3/1999 | Furuya et al. | 6,748,462 B2 | 6/2004 | Dubil et al. |
| 5,907,322 | A | 5/1999 | Kelly et al. | 6,759,967 B1 | 7/2004 | Staller |
| 5,909,183 | A | 6/1999 | Borgstahl et al. | 6,781,518 B1 | 8/2004 | Hayes et al. |
| 5,923,016 | A | 7/1999 | Fredregill et al. | 6,781,638 B1 | 8/2004 | Hayes |
| 5,940,073 | A | 8/1999 | Klosterman et al. | 6,784,804 B1 | 8/2004 | Hayes et al. |
| 5,943,228 | A | 8/1999 | Kim | 6,784,805 B2 | 8/2004 | Harris et al. |
| 5,946,646 | A | 8/1999 | Schena et al. | 6,785,579 B2 | 8/2004 | Huang et al. |
| 5,949,351 | A | 9/1999 | Hahm | 6,788,241 B2 | 9/2004 | Arling et al. |
| 5,953,144 | A | 9/1999 | Darbee et al. | 6,813,619 B1 | 11/2004 | Devara |
| 5,959,751 | A | 9/1999 | Darbee et al. | 6,826,370 B2 | 11/2004 | Escobosa et al. |
| 5,963,145 | A | 10/1999 | Escobosa | 6,828,992 B1 | 12/2004 | Freeman et al. |
| 6,002,443 | A | 12/1999 | Iggulden | 6,829,512 B2 | 12/2004 | Huang et al. |
| 6,002,450 | A | 12/1999 | Darbee et al. | 6,829,992 B2 | 12/2004 | Kobayashi et al. |
| 6,008,802 | A | 12/1999 | Lki et al. | 6,842,653 B2 | 1/2005 | Weishut et al. |
| 6,014,092 | A | 1/2000 | Darbee et al. | 6,847,101 B2 | 1/2005 | Ejelstad et al. |
| 6,040,829 | A | 3/2000 | Croy et al. | 6,859,197 B2 | 2/2005 | Klein et al. |
| 6,057,872 | A | 5/2000 | Candelore | 6,862,741 B1 | 3/2005 | Grooters |
| 6,097,309 | A | 8/2000 | Hayes et al. | 6,870,463 B2 | 3/2005 | Dresti et al. |
| 6,097,441 | A | 8/2000 | Allport | 6,874,037 B1 | 3/2005 | Abram |
| 6,097,520 | A | 8/2000 | Kadnier | 6,882,299 B1 | 4/2005 | Allport |
| 6,104,334 | A | 8/2000 | Allport | 6,882,729 B2 | 4/2005 | Arling et al. |
| 6,127,941 | A | 10/2000 | Van Ryzin et al. | 6,885,952 B1 | 4/2005 | Hayes et al. |
| 6,130,625 | A | 10/2000 | Harvey | 6,917,302 B2 | 7/2005 | Lilleness et al. |
| 6,130,726 | A | 10/2000 | Darbee et al. | 6,933,833 B1 | 8/2005 | Darbee |
| 6,133,847 | A | 10/2000 | Yang | 6,938,101 B2 | 8/2005 | Hayes et al. |
| 6,144,315 | A | 11/2000 | Flick | 6,946,988 B2 | 9/2005 | Edwards et al. |
| 6,144,375 | A | 11/2000 | Jain et al. | 6,947,101 B2 | 9/2005 | Arling |
| 6,147,677 | A | 11/2000 | Escobosa et al. | 6,968,570 B2 | 11/2005 | Hayes et al. |
| 6,154,204 | A | 11/2000 | Thompson et al. | 6,980,150 B2 | 12/2005 | Conway et al. |
| 6,157,319 | A | 12/2000 | Johns et al. | 7,005,979 B2 | 2/2006 | Haughawout et al. |
| 6,169,451 | B1 | 1/2001 | Kim | 7,009,528 B2 | 3/2006 | Griep |
| 6,173,330 | B1 | 1/2001 | Guo et al. | 7,010,805 B2 | 3/2006 | Hayes et al. |
| 6,177,931 | B1 | 1/2001 | Alexander et al. | 7,013,434 B2 | 3/2006 | Masters et al. |
| 6,195,033 | B1 | 2/2001 | Darbee et al. | RE39,059 E | 4/2006 | Foster |
| 6,198,479 | B1 | 3/2001 | Humpleman et al. | 7,046,161 B2 | 5/2006 | Hayes |
| 6,198,481 | B1 | 3/2001 | Urano et al. | 7,079,113 B2 | 7/2006 | Hayes et al. |
| 6,208,341 | B1 | 3/2001 | van Ee et al. | 7,091,898 B2 | 8/2006 | Arling et al. |
| 6,211,870 | B1 | 4/2001 | Foster | 7,093,003 B2 | 8/2006 | Yuh et al. |
| 6,223,348 | B1 | 4/2001 | Hayes et al. | 7,102,688 B2 | 9/2006 | Hayes et al. |
| 6,225,938 | B1 | 5/2001 | Hayes et al. | 7,119,710 B2 | 10/2006 | Hayes et al. |
| 6,243,035 | B1 | 6/2001 | Walter et al. | 7,126,468 B2 | 10/2006 | Arling et al. |
| 6,255,961 | B1 | 7/2001 | Van Ryzin et al. | 7,129,995 B2 | 10/2006 | Arling |
| 6,271,831 | B1 | 8/2001 | Escobosa et al. | 7,135,985 B2 | 11/2006 | Woolgar et al. |
| 6,275,268 | B1 | 8/2001 | Ellis et al. | 7,136,709 B2 | 11/2006 | Arling et al. |
| 6,278,499 | B1 | 8/2001 | Darbee | 7,142,127 B2 | 11/2006 | Hayes et al. |
| 6,288,799 | B1 | 9/2001 | Sekiguchi | 7,142,934 B2 | 11/2006 | Janik |
| 6,326,947 | B1 | 12/2001 | Capps et al. | 7,142,935 B2 | 11/2006 | Janik |
| 6,330,091 | B1 | 12/2001 | Escobosa et al. | 7,143,214 B2 | 11/2006 | Hayes et al. |
| 6,369,803 | B2 | 4/2002 | Brisebois et al. | 7,151,528 B2 | 12/2006 | Taylor et al. |
| 6,374,404 | B1 | 4/2002 | Brotz et al. | 7,154,428 B2 | 12/2006 | Clercq et al. |
| 6,397,187 | B1 | 5/2002 | Vriens et al. | 7,154,483 B2 | 12/2006 | Kobayashi |
| 6,408,435 | B1 | 6/2002 | Sato | 7,155,305 B2 | 12/2006 | Hayes et al. |
| 6,445,306 | B1 | 9/2002 | Trovato et al. | 7,161,524 B2 | 1/2007 | Nguyen |
| 6,469,633 | B1 | 10/2002 | Wachter | 7,167,765 B2 | 1/2007 | Janik |
| 6,483,548 | B1 | 11/2002 | Allport | 7,167,913 B2 | 1/2007 | Chambers |
| 6,483,906 | B1 | 11/2002 | Iggulden et al. | 7,193,661 B2 | 3/2007 | Dresti et al. |
| 6,496,135 | B1 | 12/2002 | Darbee | 7,200,357 B2 | 4/2007 | Janik et al. |
| 6,504,580 | B1 | 1/2003 | Thompson | 7,209,116 B2 | 4/2007 | Gates et al. |

| | | |
|---|---|---|
| 7,218,243 B2 | 5/2007 | Hayes et al. |
| 7,221,306 B2 | 5/2007 | Young |
| 7,224,903 B2 | 5/2007 | Colmenarez et al. |
| RE39,716 E | 7/2007 | Huang et al. |
| 7,253,765 B2 | 8/2007 | Edwards et al. |
| 7,254,777 B2 | 8/2007 | Hayes et al. |
| 7,266,701 B2 | 9/2007 | Hayes et al. |
| 7,266,777 B2 | 9/2007 | Scott et al. |
| 7,268,694 B2 | 9/2007 | Hayes et al. |
| 7,274,303 B2 | 9/2007 | Dresti et al. |
| 7,281,262 B2 | 10/2007 | Hayes et al. |
| 7,283,059 B2 | 10/2007 | Harris et al. |
| 7,319,409 B2 | 1/2008 | Hayes et al. |
| 7,436,319 B1 | 10/2008 | Harris et al. |
| 7,478,079 B2 | 1/2009 | Robertson et al. |
| 7,574,693 B1 | 8/2009 | Kemink |
| 7,612,685 B2 | 11/2009 | Harris et al. |
| 7,746,244 B2 | 6/2010 | Wouters |
| 7,889,095 B1 | 2/2011 | Harris et al. |
| 7,944,370 B1 | 5/2011 | Harris et al. |
| 8,026,789 B2 | 9/2011 | Harris et al. |
| 8,098,140 B1 | 1/2012 | Escobosa et al. |
| 2001/0033243 A1 | 10/2001 | Harris et al. |
| 2001/0045819 A1* | 11/2001 | Harris et al. ............... 323/371 |
| 2002/0008789 A1 | 1/2002 | Harris et al. |
| 2002/0046083 A1 | 4/2002 | Ondeck |
| 2002/0056084 A1 | 5/2002 | Harris et al. |
| 2002/0151327 A1 | 10/2002 | Levitt |
| 2002/0170073 A1 | 11/2002 | Miller et al. |
| 2002/0184626 A1 | 12/2002 | Darbee et al. |
| 2002/0190956 A1 | 12/2002 | Klein et al. |
| 2002/0194410 A1 | 12/2002 | Hayes et al. |
| 2003/0046579 A1 | 3/2003 | Hayes et al. |
| 2003/0048295 A1 | 3/2003 | Lilleness et al. |
| 2003/0095156 A1 | 5/2003 | Klein et al. |
| 2003/0103088 A1 | 6/2003 | Dresti et al. |
| 2003/0117427 A1 | 6/2003 | Haughawout et al. |
| 2003/0151538 A1 | 8/2003 | Escobosa et al. |
| 2003/0164773 A1 | 9/2003 | Young et al. |
| 2003/0164787 A1 | 9/2003 | Dresti et al. |
| 2003/0189509 A1 | 10/2003 | Hayes et al. |
| 2003/0193519 A1 | 10/2003 | Hayes et al. |
| 2003/0233664 A1 | 12/2003 | Huang et al. |
| 2004/0046677 A1 | 3/2004 | Dresti et al. |
| 2004/0056789 A1 | 3/2004 | Arling et al. |
| 2004/0056984 A1 | 3/2004 | Hayes et al. |
| 2004/0070491 A1 | 4/2004 | Huang et al. |
| 2004/0093096 A1 | 5/2004 | Huang et al. |
| 2004/0117632 A1 | 6/2004 | Arling et al. |
| 2004/0136726 A1 | 7/2004 | Escobosa et al. |
| 2004/0169590 A1 | 9/2004 | Haughawout et al. |
| 2004/0169598 A1 | 9/2004 | Arling et al. |
| 2004/0189508 A1 | 9/2004 | Nguyen |
| 2004/0189509 A1 | 9/2004 | Lilleness et al. |
| 2004/0210933 A1 | 10/2004 | Dresti et al. |
| 2004/0246165 A1 | 12/2004 | Conway et al. |
| 2004/0261134 A1 | 12/2004 | Perlman |
| 2004/0263349 A1 | 12/2004 | Haughawout et al. |
| 2004/0266419 A1* | 12/2004 | Arling et al. ............... 455/420 |
| 2004/0268391 A1 | 12/2004 | Clercq et al. |
| 2005/0024226 A1 | 2/2005 | Hayes et al. |
| 2005/0030196 A1 | 2/2005 | Harris et al. |
| 2005/0052423 A1 | 3/2005 | Harris et al. |
| 2005/0055716 A1 | 3/2005 | Louie et al. |
| 2005/0062614 A1 | 3/2005 | Young |
| 2005/0062636 A1 | 3/2005 | Conway et al. |
| 2005/0066370 A1 | 3/2005 | Alvarado et al. |
| 2005/0078087 A1 | 4/2005 | Gates et al. |
| 2005/0080496 A1 | 4/2005 | Hayes et al. |
| 2005/0088315 A1 | 4/2005 | Klein et al. |
| 2005/0094610 A1 | 5/2005 | de Clerq et al. |
| 2005/0096753 A1 | 5/2005 | Arling et al. |
| 2005/0097594 A1 | 5/2005 | O'Donnell et al. |
| 2005/0097618 A1* | 5/2005 | Arling et al. ............... 725/114 |
| 2005/0107966 A1 | 5/2005 | Hayes |
| 2005/0116930 A1 | 6/2005 | Gates |
| 2005/0134578 A1 | 6/2005 | Chambers et al. |
| 2005/0159823 A1 | 7/2005 | Hayes et al. |
| 2005/0162282 A1 | 7/2005 | Dresti et al. |
| 2005/0179559 A1 | 8/2005 | Edwards et al. |
| 2005/0183104 A1 | 8/2005 | Edwards et al. |
| 2005/0195979 A1 | 9/2005 | Arling et al. |
| 2005/0200598 A1 | 9/2005 | Hayes et al. |
| 2005/0210101 A1 | 9/2005 | Janik |
| 2005/0216606 A1 | 9/2005 | Hayes et al. |
| 2005/0216843 A1 | 9/2005 | Masters et al. |
| 2005/0231649 A1 | 10/2005 | Arling |
| 2005/0258806 A1 | 11/2005 | Janik et al. |
| 2005/0280743 A1 | 12/2005 | Dresti et al. |
| 2005/0283814 A1 | 12/2005 | Scott et al. |
| 2005/0285750 A1 | 12/2005 | Hayes et al. |
| 2006/0007306 A1 | 1/2006 | Masters et al. |
| 2006/0012488 A1 | 1/2006 | Hilbrink et al. |
| 2006/0031400 A1 | 2/2006 | Yuh et al. |
| 2006/0031437 A1 | 2/2006 | Chambers |
| 2006/0031549 A1 | 2/2006 | Janik et al. |
| 2006/0031550 A1 | 2/2006 | Janik et al. |
| 2006/0050142 A1 | 3/2006 | Scott et al. |
| 2006/0055554 A1 | 3/2006 | Hayes et al. |
| 2006/0101498 A1 | 5/2006 | Arling et al. |
| 2006/0125800 A1 | 6/2006 | Janik |
| 2006/0132458 A1 | 6/2006 | Garfio et al. |
| 2006/0143572 A1 | 6/2006 | Scott et al. |
| 2006/0150120 A1 | 7/2006 | Dresti et al. |
| 2006/0161865 A1 | 7/2006 | Scott et al. |
| 2006/0192855 A1 | 8/2006 | Harris et al. |
| 2006/0194549 A1 | 8/2006 | Janik et al. |
| 2006/0200538 A1 | 9/2006 | Yuh et al. |
| 2006/0259183 A1 | 11/2006 | Hayes et al. |
| 2006/0259184 A1 | 11/2006 | Hayes et al. |
| 2006/0259864 A1 | 11/2006 | Klein et al. |
| 2006/0262002 A1 | 11/2006 | Nguyen |
| 2006/0283697 A1 | 12/2006 | Garfio |
| 2006/0288300 A1 | 12/2006 | Chambers et al. |
| 2006/0294217 A1 | 12/2006 | Chambers |
| 2007/0037522 A1 | 2/2007 | Liu et al. |
| 2007/0052547 A1 | 3/2007 | Haughawout et al. |
| 2007/0061027 A1 | 3/2007 | Janik |
| 2007/0061028 A1 | 3/2007 | Janik |
| 2007/0061029 A1 | 3/2007 | Janik |
| 2007/0063860 A1 | 3/2007 | Escobosa et al. |
| 2007/0073958 A1 | 3/2007 | Kalayjian |
| 2007/0077784 A1 | 4/2007 | Kalayjian et al. |
| 2007/0097275 A1 | 5/2007 | Dresti et al. |
| 2007/0136693 A1 | 6/2007 | Lilleness et al. |
| 2007/0156739 A1 | 7/2007 | Black et al. |
| 2007/0178830 A1 | 8/2007 | Janik et al. |
| 2007/0206949 A1 | 9/2007 | Mortensen |
| 2007/0225828 A1 | 9/2007 | Huang et al. |
| 2007/0233740 A1 | 10/2007 | Nichols et al. |
| 2007/0258595 A1 | 11/2007 | Choy |
| 2007/0271267 A1 | 11/2007 | Lim et al. |
| 2007/0279244 A1 | 12/2007 | Haughawout et al. |
| 2007/0296552 A1 | 12/2007 | Huang et al. |
| 2008/0005764 A1 | 1/2008 | Arling et al. |
| 2008/0016467 A1 | 1/2008 | Chambers et al. |
| 2008/0016468 A1 | 1/2008 | Chambers et al. |
| 2008/0036642 A1 | 2/2008 | Harris et al. |
| 2008/0042982 A1 | 2/2008 | Gates et al. |
| 2008/0062033 A1 | 3/2008 | Harris et al. |
| 2008/0062034 A1 | 3/2008 | Harris et al. |
| 2008/0068247 A1 | 3/2008 | Harris et al. |
| 2008/0198059 A1 | 8/2008 | Harris et al. |
| 2008/0302582 A1 | 12/2008 | Sekhri et al. |
| 2009/0224955 A1 | 9/2009 | Bates et al. |
| 2010/0033638 A1 | 2/2010 | O'Donnell |
| 2011/0133976 A1 | 6/2011 | Harris et al. |
| 2012/0326852 A1 | 12/2012 | Harris et al. |

FOREIGN PATENT DOCUMENTS

| | | |
|---|---|---|
| CA | 2092003 A1 | 11/2008 |
| CN | 1399444 A | 2/2003 |
| CN | 1434422 A | 8/2003 |
| DE | 19520754 A1 | 12/1996 |
| EP | 103 438 A1 | 3/1984 |
| EP | 0103438 A1 | 3/1984 |
| EP | 0398 550 A2 | 11/1990 |
| EP | 0972280 A1 | 1/2000 |

| | | | |
|---|---|---|---|
| EP | 1014577 A1 | 6/2000 | |
| EP | 1198069 B1 | 4/2002 | |
| EP | 1777830 A1 | 4/2007 | |
| FR | 2738931 A1 | 3/1997 | |
| GB | 2081948 A | 2/1982 | |
| GB | 2175724 A | 12/1986 | |
| GB | 2304217 A | 12/1997 | |
| JP | 7-075173 A | 3/1995 | |
| JP | 7112301 B | 11/1995 | |
| JP | 2002058079 A | 2/2002 | |
| JP | 2002271871 A | 9/2002 | |
| JP | 2003087881 A | 3/2003 | |
| MX | PA/2003000322 A | 11/2003 | |
| WO | WO 01/69567 A2 | 9/1991 | |
| WO | WO 93/12612 A1 | 6/1993 | |
| WO | WO 93/19427 A1 | 9/1993 | |
| WO | WO 94/15417 A1 | 7/1994 | |
| WO | WO 95/01056 A1 | 1/1995 | |
| WO | WO 95/01057 A1 | 1/1995 | |
| WO | WO 95/01058 A1 | 1/1995 | |
| WO | WO 95/01059 A1 | 1/1995 | |
| WO | WO 95/32563 A1 | 11/1995 | |
| WO | WO 95/32583 A1 | 11/1995 | |
| WO | WO 96/28903 A1 | 9/1996 | |
| WO | WO 96/30864 A1 | 10/1996 | |
| WO | WO 97/33434 A1 | 9/1997 | |
| WO | WO 98/43158 A | 10/1998 | |
| WO | WO 98/44477 A1 | 10/1998 | |
| WO | WO 99/04568 A1 | 1/1999 | |
| WO | WO 99/34564 A1 | 7/1999 | |
| WO | WO 00/34851 A1 | 6/2000 | |
| WO | WO 03/044684 A1 | 5/2003 | |
| WO | WO 03/045107 A1 | 5/2003 | |
| WO | WO 03/060804 A1 | 7/2003 | |
| WO | WO 03/100553 A2 | 12/2003 | |

OTHER PUBLICATIONS

U.S. Appl. No. 11/267,528, filed Nov. 3, 2005, Harris et al.
Ciarcia S. "Build a Trainable Infrared Master Controller" Byte 12(3):113-123 (1987).
Ciarcia S. The Best of Ciarcia's Circuit Cellar pp. 345-354 (1987).
Konstan J. A. "State problems in programming human-controlled devices" Digest of Tech. Papers of Int. Conf. on Consumer Electronics (ICCE) pp. 122-123 (1994).
Press Release: "Philips Revolutionizes Home Theatre Control"; 1998 3 pages.
"ProntoEdit User Manual"; 2002 http://www.pronto.philips.com/index.cfm?id=241 85 pages.
"Pronto Review"; www.remotecentral.com/pronto/index.html 3 pages.
Pronto link to downloadable files for components from different manufacturers; http://www.remotecentral.com/files/index.html 3 pages.
Radio Shack Universal Remote Control Owners Manual pp. 1-29 (1987).
Notice of Allowance for U.S. Appl. No. 09/090,315 mailed Dec. 14, 1999; 19 pages.
Final Office Action for U.S. Appl. No. 09/090,315 mailed on Aug. 23, 1999; 22 pages.
Final Office Action for U.S. Appl. No. 09/804,619 mailed on Jun. 30, 2005; 24 pages.
Non-Final Office Action for U.S. Appl. No. 09/804,619 mailed on Nov. 16, 2004; 23 pages.
Non-Final Office Action for U.S. Appl. No. 09/804,624 mailed on Oct. 23, 2003; 12 pages.
Non-Final Office Action for U.S. Appl. No. 09/804,624 mailed on May 21, 2004; 13 pages.
Final Office Action for U.S. Appl. No. 09/804,624 mailed on Dec. 2, 2004; 18 pages.
Non-Final Office Action for U.S. Appl. No. 09/804,624 mailed on May 3, 2005; 18 pages.
Final Office Action for U.S. Appl. No. 09/804,624 mailed on Dec. 28, 2005; 19 pages.
Non-Final Office Action for U.S. Appl. No. 09/804,624 mailed on May 17, 2006; 24 pages.
Notice of Allowance for U.S. Appl. No. 09/804,624 mailed on Jan. 11, 2007; 6 pages.
Final Office Action for U.S. Appl. No. 10/839,970 mailed on Jun. 30, 2005; 11 pages.
Non-Final Office Action for U.S. Appl. No. 10/839,970 mailed on Dec. 20, 2005; 7 pages.
Non-Final Office Action for U.S. Appl. No. 10/839,970 mailed on Jan. 3, 2007; 9 pages.
Final Office Action for U.S. Appl. No. 10/839,970 mailed on Jun. 18, 2007; 10 pages.
Non-Final Office Action for U.S. Appl. No. 10/839,970 mailed on Mar. 14, 2008; 9 pages.
Final Office Action for U.S. Appl. No. 10/839,970 mailed on Oct. 1, 2008; 23 pages.
Notice of Allowance for U.S. Appl. No. 10/839,970 mailed on Jun. 12, 2009; 7 pages.
Final Office Action for U.S. Appl. No. 10/870,339 mailed on Jul. 10, 2009; 18 pages.
Non-Final Office Action for U.S. Appl. No. 10/870,339 mailed on Aug. 22, 2008; 18 pages.
Notice of Allowance for U.S. Appl. No. 10/870,339 mailed on May 1, 2008; 14 pages.
Final Office Action for U.S. Appl. No. 10/870,339 mailed on Oct. 17, 2007; 10 pages.
Non-Final Office Action for U.S. Appl. No. 10/870,339 mailed on Feb. 20, 2007; 12 pages.
Final Office Action for U.S. Appl. No. 10/870,339 mailed on Jun. 29, 2006; 17 pages.
Non-Final Office Action for U.S. Appl. No. 10/870,339 mailed on Sep. 30, 2005; 11 pages.
Non-Final Office Action for U.S. Appl. No. 11/199,922 mailed on Jul. 7, 2006; 13 pages.
Final Office Action for U.S. Appl. No. 11/199,922 mailed on Jan. 23, 2007; 7 pages.
Advisory Action for U.S. Appl. No. 11/199,922 mailed on Mar. 27, 2007; 3 pages.
Non-Final Office Action for U.S. Appl. No. 11/199,922 mailed on Jun. 5, 2007; 6 pages.
Final Office Action for U.S. Appl. No. 11/199,922 mailed on Feb. 11, 2008; 6 pages.
Notice of Allowance for U.S. Appl. No. 11/199,922 mailed on Jul. 3, 2008; 6 pages.
Final Office Action for U.S. Appl. No. 11/267,528 mailed on Oct. 28, 2008; 9 pages.
Advisory Action for U.S. Appl. No. 11/267,528 mailed on Apr. 30, 2009; 3 pages.
Non-Final Office Action for U.S. Appl. No. 11/267,528 mailed on Jun. 2, 2009; 9 pages.
Final Office Action for U.S. Appl. No. 11/267,528 mailed on Jan. 15, 2010; 8 pages.
Non-Final Office Action for U.S. Appl. No. 11/267,528 mailed on Jun. 8, 2010; 9 pages.
Notice of Allowance for U.S. Appl. No. 11/267,528 mailed on Jul. 14, 2010; 13 pages.
Non-Final Office Action for U.S. Appl. No. 11/411,398 mailed Oct. 5, 2009; 19 pages.
Final Office Action for U.S. Appl. No. 11/411,398 mailed on Apr. 28, 2010; 13 pages.
Non-Final Office Action for U.S. Appl. No. 11/841,748 mailed on Dec. 17, 2009; 13 pages.
Final Office Action for U.S. Appl. No. 11/841,748 mailed on Aug. 11, 2010; 14 pages.
Non-Final Office Action for U.S. Appl. No. 11/748,380 mailed on Jan. 11, 2010; 13 pages.
Final Office Action for U.S. Appl. No. 11/841,764 mailed Apr. 2, 2010; 8 pages.
Final Office Action for U.S. Appl. No. 11/841,764 mailed on Jan. 8, 2009; 10 pages.
Non-Final Office Action for U.S. Appl. No. 11/841,764 mailed on Apr. 11, 2008; 6 pages.
Non-Final Office Action for U.S. Appl. No. 11/841,764 mailed on Jun. 17, 2009; 8 pages.

Final Office Action for U.S. Appl. No. 11/841,778 mailed on Apr. 12, 2010; 9 pages.
Non-Final Office Action for U.S. Appl. No. 11/841,778 mailed on Jun. 10, 2009; 14 pages.
Non-Final Office Action for U.S. Appl. No. 11/841,778 mailed on Sep. 8, 2010; 9 pages.
Non-Final Office Action for U.S. Appl. No. 11/841,753 mailed on Dec. 18, 2009; 14 pages.
Non-Final Office Action for U.S. Appl. No. 12/245,675 mailed on Apr. 2, 2010; 6 pages.
Final Office Action for U.S. Appl. No. 12/387,631 mailed Jun. 8, 2010; 11 pages.
Notice of Allowance for U.S. Appl. No. 09/080,315 mailed Nov. 22, 1999; 19 pages.
Notice of Allowance for U.S. Appl. No. 09/080,315 mailed Dec. 14, 1999; 4 pages.
Final Office Action for U.S. Appl. No. 09/080,315 mailed on Aug. 23, 1999; 22 pages.
Notice of Allowance for U.S. Appl. No. 12/245,675 mailed on Oct. 6, 2010; 5 pages.
Non-Final Office Action for U.S. Appl. No. 10/984,954 mailed on Nov. 5, 2008; 13 pages.
Restriction requirement for U.S. Appl. No. 10/984,954 mailed on Sep. 4, 2008; 7 pages.
Final Office Action for U.S. Appl. No. 10/119,264 mailed on Aug. 20, 2008; 11 pages.
Non-Final Office Action for U.S. Appl. No. 10/119,264 mailed on Feb. 6, 2008; 9 pages.
Final Office Action for U.S. Appl. No. 10/119,264 mailed on Jul. 16, 2007; 8 pages.
Non-Final Office Action for U.S. Appl. No. 10/870,339 mailed on Feb. 19, 2010; 10 pages.
Final Office Action for U.S. Appl. No. 10/870,339 mailed on Jul. 10; 2009; 18 pages.
Non-Final Office Action for U.S. Appl. No. 10/870,339 mailed on Oct. 20, 2008; 9 pages.
Non-Final Office Action for U.S. Appl. No. 10/870,339 mailed on Aug. 22, 2008; 19 pages.
Final Office Action for U.S. Appl. No. 10/870,339 mailed on Jun. 29; 2006; 17 pages.
Non-Final Office Action for U.S. Appl. No. 10/870,339 mailed on Sep. 30; 2005; 11 pages.
Non-Final Office Action for U.S. Appl. No. 09/672,161 mailed on Nov. 28, 2005;11 pages.
Final Office Action for U.S. Appl. No. 09/672,161 mailed on Jun. 29, 2005; 12 pages.
Advisory Action for U.S. Appl. No. 09/672,161 mailed on Sep. 21, 2005; 3 pages.
Non-Final Office Action for U.S. Appl. No. 09/672,161 mailed on Sep. 22, 2004; 13 pages.
Non-Final Office Action for U.S. Appl. No. 11/841,778 mailed on Jun. 10, 2009; 9 pages.
International Search Report for PCT/CA01/00323 mailed on Apr. 4, 2002; 7 pages.

* cited by examiner

SYSTEM AND METHOD FOR ADAPTIVE PROGRAMMING OF A REMOTE CONTROL

CROSS-REFERENCES TO RELATED APPLICATIONS

This application is related to and claims priority from U.S. Provisional Application No. 60/673,479, filed Apr. 20, 2005, and is fully incorporated herein by reference for all purposes.

FIELD OF THE INVENTION

The present invention relates to remote controls. More specifically, the present invention relates to remote controls wherein the specific behavior and/or operation of the remote control can adapt based upon how the remote is used by a user.

BACKGROUND OF THE INVENTION

Remote controls for consumer electronics devices have increased in complexity, to match the many inputs and options available to control devices, and in ubiquity as many consumer electronics devices come with or support remote controls.

The assignee of the present invention offers a unique remote control, sold under the Harmony™ brand, which provides for enhanced control of consumer electronics devices and, more importantly, systems of such devices. For example, a home theatre system typically includes a television, a DVD player, and a surround sound system. More advanced home theatre systems can further include room lighting control systems, environmental controls (HVAC) for the room, motorized viewing screen (for projection televisions) and/or motorized window curtain systems.

Typically all of these devices can be controlled via remote controls supplied with the devices and, preferably, all of these devices can be controlled with a single remote which is sold with a database of the necessary commands for each device or which can learn the necessary commands from the OEM remote controls sold with the devices.

While such systems have gained wide popularity, performing an activity such as watching a DVD can require the user to select twenty, or more, commands to activate the necessary devices and configure them properly. For example, the television set must be turned on, commanded to use the input from the DVD player, the DVD player must be turned on and commanded to start playing the DVD, the surround sound system must be turned on and commanded to use the DVD player output as an input, etc. Even when the user has a single remote control which can generate all of the necessary command signals, it can be difficult and/or tedious to operate the remote control to output all of the necessary commands in the correct sequence.

Further, once the devices in the system have been properly configured for an activity, control of the system is often non-intuitive. For example, pressing the button on the remote control to increase the volume of the DVD being watched may result in the volume of the television set being incorrectly increased, rather than the volume of the surround sound system correctly being increased.

Prior art attempts to address this problem have employed programming collections of commands, typically referred to as "macros", into the remote control. Once programmed, ideally the user can press a single button on the remote to, for example, turn on and configure the system to perform an activity such as watch a DVD movie as the remote will "play" the macro and transmit each of the recorded commands in turn.

While such macro systems can improve the usability of complex systems of consumer electronics devices, serious problems exist with such macro systems. One problem is that it can be difficult for many people to create the necessary macros as the macros can be quite complex and many consumers pay installation contractors to program an appropriate set of macros into their remotes.

A more serious problem is that such macro systems are "state-less" in that the macro is recorded based upon an assumption of the operating state of the devices to be controlled by the macro and deviations in any device from its assumed state can result in the failure of the macro to properly configure the system. For example, if a television set has a "toggle" type command for its power control (i.e., each time a POWER command is sent to the television, the television turns OFF, if it is ON, or turns ON if it is OFF), then a macro to watch a DVD movie must include an assumption that the TV is in a given state, such as ON. If a macro is recorded to watch a DVD movie and the remote control assumes the TV is ON prior to execution of the macro, and if the TV is in fact OFF when the macro is executed, an inoperative result occurs as the remote will not transmit a POWER command to the TV and the TV will not be turned ON. In fact, this inoperative result typically cannot be corrected merely by turning the TV ON, because with the TV OFF when the macro executed, the TV will have ignored the other commands sent to it by the remote to, for example, change the input the TV is currently using to the input connected to the DVD player, etc.

This can result in ludicrous systems wherein the user must execute one macro to watch a DVD if their system is presently OFF and another macro to watch a DVD if their system is ON and presently configured to watch a television program and another macro to watch a DVD if their system is presently ON and configured to play a CD, etc., or other non-intuitive systems wherein the system must be returned to a predefined configuration before a macro is executed to configure the system for another activity.

To address these disadvantages and others, the above-mentioned Harmony™ remotes employ a state-based strategy to control devices and employ a web-based configuration method and system. The Harmony remotes store a representation of the current state of each device controlled by the remote and determine the commands which must be transmitted to each device to change the overall state of the system from one state (e.g., listen to CD) to another (e.g., watch a DVD).

The Harmony remotes employ an internet-based configuration method and system wherein the remote is connected, via the Internet, to a device database and a configuration compiler which, through an interactive web page dialog/process with the user, programs the remote to control the user's devices.

The Harmony remotes employ technologies described in U.S. Pat. No. 6,784,805; published U.S. Application 2005/0052423; published U.S. Application 2005/0030196; published U.S. Application 2002/0056084; and published U.S. Application 200/0045819, all to Harris et al., all assigned to the assignee of the present invention, and the contents of this patent and these published applications are incorporated herein by reference.

While the Harmony™ remotes offer many advantages over prior art remotes, it can be difficult to troubleshoot the configuration process and/or it can be difficult for a user to customize the operation and arrangement of their remote.

It is desired to have a system and method that can improve the ability to troubleshoot the configuration of a remote control and/or to adaptively configure the remote control to correspond more closely to how the remote is typically used.

BRIEF SUMMARY OF THE INVENTION

It is an object of the present invention to provide a novel method and system for adaptively configuring a remote control which obviates or mitigates at least one disadvantage of the prior art.

According to a first embodiment of the present invention, a remote control system is provided that includes a remote control operable to log and store user initiated events relating to the control of devices with the remote control, the remote control operating in accordance with a configuration data set stored in the remote control; a device database storing identifications of devices to be controlled by the remote control and the command sets for those devices; an analysis module operable to analyze the log of events stored by the remote control to identify one or more patterns of interest in the logged use of the remote control by the user; and a configuration utility operable with the device database and the analysis module to create a configuration data set to operate the remote control in accordance with at least one identified pattern of interest.

Preferably, in response to the results produced by the analysis module, the configuration utility conducts an interactive dialog with the user as to whether they would like a suggested change in the operation of the remote control to be implemented and the configuration utility will effect the change if the user responds accordingly.

According to another embodiment of the present invention, a method is provided for adaptively configuring a remote control to operate at least one device. The method includes identifying to a configuration utility the at least one device to be controlled by the remote control, and retrieving from a database of command sets for devices, the command set and capabilities of the identified at least one device. A configuration data set is created for operating the remote control to control the device using the retrieved command set and transferring that configuration data set to the remote control. The remote control is used to operate the at least one device and for storing a log of each event relating to the control of the device. At select intervals, the stored log of events is analyzed to identify at least one pattern of interest indicating how the user of the remote control operates the device. The configuration data set is altered in response to the at least one identified pattern of interest. And the altered configuration data set is downloaded to the remote control to alter how the remote control operates the at least one device.

The present invention provides a method and system for adaptively configuring a remote control. The system and method can analyze a log of events, maintained by the remote, which indicates how the remote and the devices it controls are used by a user and can then suggest alternative configurations of the remote to the user. The range and type of alternative configurations is not particularly limited and can include changing which devices are employed for various user activities and/or how those activities are performed, the placement and hierarchy of commands in a menu tree and/or troubleshooting and set up configurations.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
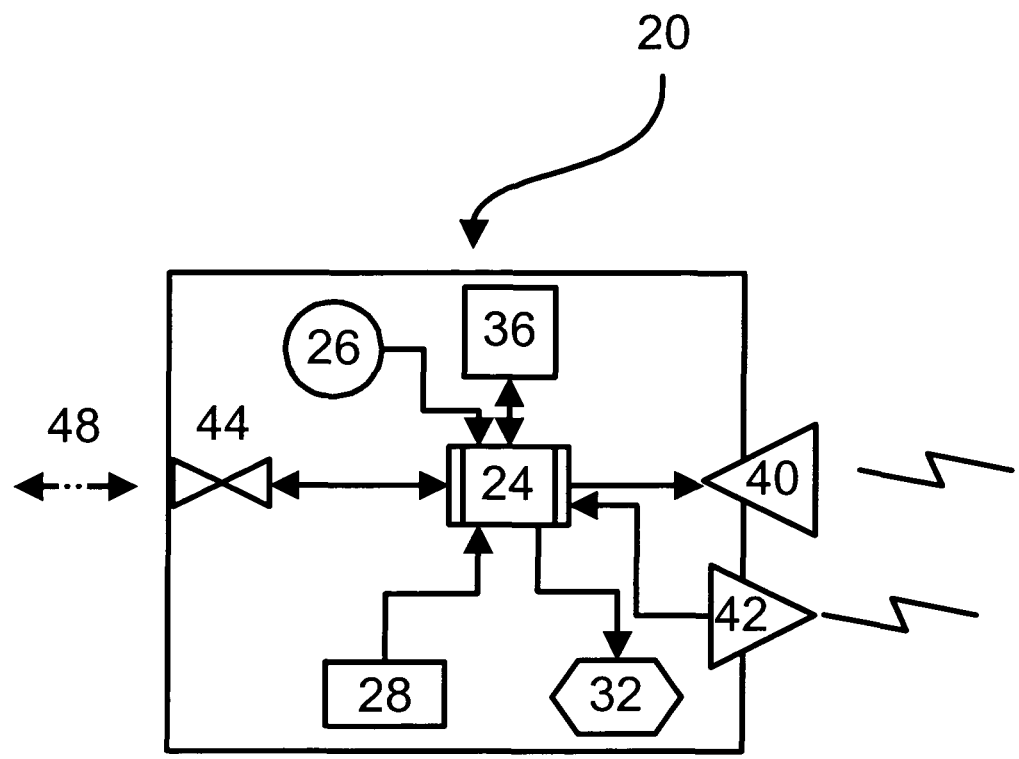
FIG. 1 is a schematic diagram of a state-based remote control for use with the present invention.

A remote control, similar to the above-described Harmony™ type of remote controls is indicated generally at 20 in FIG. 1. Remote control 20 includes a microprocessor 24, which can be any suitable microprocessor or microcontroller as will be apparent to those of skill in the art. Preferably, microprocessor 24 is a low power microprocessor suitable for use with battery powered devices such as remote control 20.

Microprocessor 24 and the other components, described below, within remote control 20 are connected to a power supply 26, which can be a battery or other suitable power supply. Microprocessor 24 is further connected to keypad 28, which includes a number of keys which can be activated by a user to operate remote control 20, and to a display 32 which can display text and/or graphics to the user of remote control 20. Keypad 28 can be any suitable keypad, as will occur to those of skill in the art, including a membrane keypad or a touchscreen on display 32. In the latter case, display 32 is preferably an LCD display although display 32 can be any other suitable type of display, such as an electro luminescent device, etc.

Preferably, one or more keys on keypad 28 are located adjacent display 32 (or on display 32 in the case of keypad 28 being a touchscreen on display 32). Depending upon the operating mode of remote control 20 and the devices being controlled by it, these keys can have different functions assigned to them by microprocessor 24 and appropriate text messages or graphics can be displayed on display 32 adjacent those keys to obtain "soft" keys.

Remote control 20 further includes a non volatile memory 36 which is used to store the configuration for remote control 20, including the appropriate command sets for each device being controlled by remote control 20, and the representations of the state of each device being controlled by remote control 20. Memory 36 can be any suitable non volatile memory, such as battery backed-up static ROM, Flash ROM or a magnetic-based memory, such as a disc drive, etc.

Microprocessor 24 is also connected to at least one control signal transmitter 40 and to a network interface device 44. Each control signal transmitter 40 is operable to transmit the signals required to control one or more of the devices being controlled with remote control 20. Control signal transmitters 40 can include infrared (IR) transmitters, radio frequency (RF) transmitters, such as Bluetooth or proprietary RF systems, etc. which the devices being controlled with remote control 20 are responsive to. It is contemplated that remote control 20 can be equipped with more than one control transmitter 40 when one or more devices it is to control require control signals transmitted via different transmission modalities (i.e., RF and IR). Remote control 20 can also include one or more control signal receivers 42 to allow remote control 20 to receive control signals from other remote controls to learn new command signals, etc.

Network interface device 44 allows remote control 20 to be connected to a remote device database and configuration utility (e.g., a server, a computer, etc.) via a network connection 48. Network interface device 44 can be any suitable interface device for interfacing remote control 20 to network connection 48, as will occur to those of skill in the art. In a present embodiment, network interface device 44 is a USB transceiver and network connection 48 is a USB connection to a computing device (not shown), such as a personal computer, which is in turn connectable to the remote device database and configuration utility via the Internet. It is also contemplated that network connection 48 can be a wireless link, such as a WiFi (IEEE 802.11x) connection, a Bluetooth link, etc. and, in such cases network interface device 44 is selected to provide the necessary connectivity, as will be apparent to those of skill in the art.

As will be apparent to those of skill in the art, the components of remote control 20 can be separate devices or, as a result of large scale integration, microprocessor 24, non volatile memory 36 and network interface device 44 and other components of remote control 20 can be implemented as a single integrated circuit device for considerations of cost and reduced power consumption.

Figure 2:
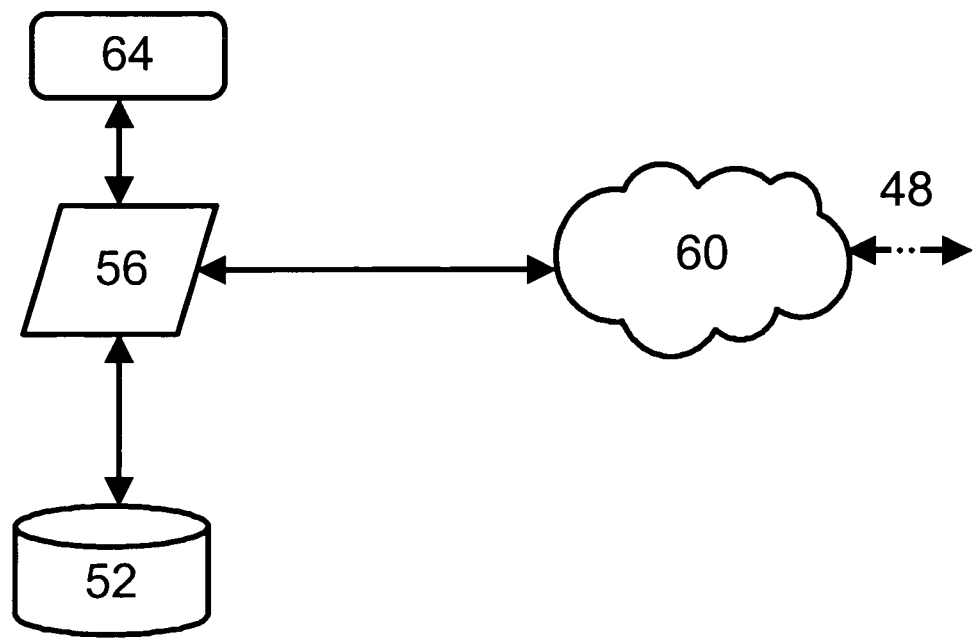
FIG. 2 is a schematic diagram of a device database, configuration utility and analysis module for use with the present invention.

To setup remote control 20, the user connects remote control 20, via network connection 48, to a remote device database 52 and a configuration utility 56, shown in FIG. 2. It is contemplated that in many circumstances, remote control 20 will connect via network connection 48 to a personal computer (not shown) and the personal computer will connect, via the Internet or other network 60, to device database 52 and configuration utility 56, but it is also contemplated that remote control 20 can connect directly to network 60 and device database 52 and configuration utility 56.

As used herein the term device database is intended to comprise any suitable means for storing relevant information, such as command sets and features, for devices to be controlled. Device databases can be implemented with relational database systems, simple lookup tables, or any other appropriate means of storing device information as will be apparent to those of skill in the art.

As configuration utility 56 requires an interactive connection with the user of remote control 20, a suitable web page or other interface can be displayed to the user on the personal computer, if remote control 20 was connected to network 60 via such a personal computer, or a suitable interface can be displayed on display 32, if remote control 20 was directly connected to network 60.

Once the user has connected to the configuration utility 56, the user is prompted to establish a user account, if this is the first time the user has connected, or to log in to their existing account. Assuming this is the first time the user has connected, after the account has been set up, the user is asked to input identifications, for example the manufacturer and model number, of each device they wish to control. When the devices to be controlled have been identified by the user, the capabilities and command sets of the devices are determined by configuration utility 56 and are available to configuration utility 56 from device database 52. If one or more devices are not known to device database 52, the user can be prompted to perform a learning operation and suitable learning processes are well known to those of skill in the art and will not be described further herein.

Configuration utility 56 can then prompt the user to specify how the user would prefer that various aspects of the system of devices controlled by remote control 20 operate. For example, the user can be asked whether they would prefer to use their surround sound system when listening to regular television programming, or whether they would prefer to just use the television's audio system.

Once configuration utility 56 has obtained any necessary user input, configuration utility 56 refers to device database 52 and creates a configuration data set comprising the IR (or other modality) command set for each device to be controlled with remote control 20, an operating program for remote control 20 and a state map for the system of devices. This configuration data set is then loaded into non volatile memory 36 via network connection 48.

The above-described Harmony™ remotes operate substantially as described in the paragraphs above. However, the consumer electronics devices and other devices to be controlled with remote control 20 can have broad feature sets and systems of such devices can have many different possible operating states and it is difficult to have the configuration utility automatically create configuration data sets which match the user's desires and/or needs. Further, the user themselves may not be aware of how they would prefer the system of their devices to operate and their usage patterns can change over time.

Accordingly, in the present invention, after remote control 20 has been configured to control the system of the user's devices, remote control 20 further operates to store a log of the events initiated by the user of remote control 20. Most events will represent keys pressed by the user of remote control 20 and the time and date at which they were pressed and related state information, such as the television channel they switched to, etc. As the context of the keys on keypad 28 can change, depending upon the operating state of remote control 20 and the system of the user's devices, remote control 20 logs the function of the key pressed, rather than (or in addition to) the actual keypad button pressed. As an example, a user can press a "PLAY" key while watching a DVD, a VHS movie or while listening to CD's and these events are very different. Accordingly, remote control 20 will log the context of the key pressed, i.e., "play DVD", "play VHS", or "play CD".

It is contemplated that the stored log of events need not only contain key press events and any other event of interest can also be logged and stored. For example, remote control 20 can include a touch pad (not shown) input device in addition to, or instead of, keypad 28 and "gestures" input with such a touch pad can be logged and stored, as can their meaning and/or context.

As remote control 20 stores a representation of the state of the devices it is controlling, most relevant information about the system of devices controlled by remote control 20 will be available (or discernable) from the log. For example, the channel on a television being watched by a user can be directly stored in the log, or can be determined from other entries in the log (television was on station 4 but the user pressed the "Channel UP" button three times, so the television is now on channel 7), as can the volume level, the display settings (color balance, brightness, contrast, etc.) and this can allow configuration utility 56 to perform a significant amount of analysis of the user's use of remote control 20.

The log of events is stored in non volatile memory 36 and is uploaded to configuration utility 56 at an appropriate time.

Preferably, the storage of logged events in remote control 20 is achieved by a circular buffer such that, if the memory available for storing the logged events is exceeded before the information is uploaded, the newest stored logged events merely overwrite the oldest stored logged events rather than cause an error or overwrite other contents of non-volatile memory 36. Alternatively, but less desirable, once the memory available for storing the log has been filled, further logging of events can be terminated until the existing log has been uploaded. If network connection 48 is a wireless link, then remote control 20 can automatically transfer the log of stored events at appropriate intervals, such as when each event occurs, after a defined period of time has passed since the last transfer or when the size of the log of events reaches a preset size, etc.

Remote control 20 can also operate to prompt the user, on display 32 for example, to connect remote control 20 to network connection 48 to allow uploading of the logged information either after a specified time of use of remote control 20 has elapsed (for example once a week) or when the amount of memory in non-volatile memory 36 storing the logging info has reached a pre-selected level (for example 80% of the memory available for logging data), etc.

Alternatively, configuration utility 56 can prompt the user of remote control 20, at appropriate intervals, to connect remote control 20 to allow uploading of the logged data. It is contemplated that, as part of the set up of a user account with configuration utility 56, a user will provide contact information such as a valid email address. In this case, configuration utility 56 can email a prompt to the user to connect their remote control 20 to network connection 48 to allow uploading of the stored events.

It is further contemplated that if remote control 20 is connected to configuration utility 56 via network connection 48 for any reason, such as configuring remote control 20 to work with a new device added by the user to the devices to be controlled with remote control 20, the logged events will be uploaded to the remote configuration utility.

Each time the logged events are uploaded to configuration utility 56, configuration utility 56 can analyze the events for one or more patterns of interest in the logged events and can initiate a dialog with the user, via the web page or other user interface associated with configuration utility 56, with respect to the identified patterns of interest. To this end, configuration utility 56 includes an analysis module 64 (which may be a hardware module, a software module, a firmware module or the like configured to execute one or more analysis functions) to examine the stored log of events. The implementation of analysis module 64 is not particularly limited and can be achieved in a variety of manners, as will be apparent to those of skill in the art.

For example, in a simple implementation, analysis module 64 can be constructed as a simple parsing and/or pattern matching program. In a presently preferred, but more complex, implementation analysis module 64 can employ advanced analysis techniques including, without limitation, neural networks, fuzzy logic and expert systems.

For example, during a prior session with configuration utility 56, the user can have responded to a prompt from configuration utility 56 such that remote control 20 operates the user's system of devices to employ the television set's audio capabilities for sound when watching television programs, rather than the surround sound system. Analysis module 64 of configuration utility 56 can note a pattern of interest where, in actual use, when the user watches a television program, they frequently manually employ remote control 20 to activate the surround sound system.

In such a case, configuration utility 56 can prompt the user as to whether they would like to have the surround sound system used as the default audio system when watching television programs. If the user responds that they do not want to change the configuration to have the surround sound system as the default audio system for watching television, then configuration utility 56 will not change the configuration of remote control 20. If desired by the user, this decision can be stored in a user preferences file stored by configuration utility 56 so that the user will not be asked this question again, or will not be asked it within a pre-defined time period (e.g., three months) and a prompt to this effect can be displayed to the user.

Conversely, if the user responds to the prompt that they now would like the surround sound system to be the default audio system when viewing television programs, configuration utility 56 can construct an amended configuration data set for remote control 20 and can download that configuration data set to remote control 20 to effect the desired change in how the system of the user's devices is operated by remote control 20 so that the surround sound system will be the default audio system for watching television programs.

While it is presently preferred that the user be prompted to accept a suggested change to the configuration of remote control 20, the present invention is not so limited and if desired, configuration utility 56 can automatically effect all changes, or a subset of changes, without prompting the user.

It is contemplated that more advanced behaviors can be employed by configuration utility 56. For example, in the television audio configuration example given above, if the user responds to the prompt regarding changing the default audio system for television viewing to indicate that they wish the default system to remain the television set's audio system, configuration utility 56 can next prompt the user as to whether they would like a function to change the audio system from the television set's audio system to the surround sound system to be assigned to one of the "soft" keys on remote control 20 during television viewing.

If the user responds affirmatively to this prompt, configuration utility 56 can modify the configuration data set fro remote control 20 such that, when remote control 20 is being used to watch a television program, one of the soft keys of remote control 20 will operate as a toggle to change the audio system employed with the television program between the television set's audio system and the surround sound system. In such as case, an appropriate prompt for the soft key will be displayed on display 32 and that prompt can change with the state of the function. For example, the prompt can be "Change to Surround Sound" when the television set audio system is in use and can be changed to "Change to Television Audio System" when the surround sound system is in use.

Examples of other patterns of interest that can be recognized by analysis module 64 of configuration utility 56 can include, without limitation:

(a) time-based patterns such as recognizing that the user regularly activates the backlight function for keypad 28 and display 32 of remote control 20 when watching movies. In such a case, configuration utility 56 can prompt the user as to whether they would like the time for which the backlight remains illuminated to be increased when they are watching movies and can update the configuration data set for remote control 20 accordingly;

(b) use-based patterns such as recognizing that the user regularly uses a typically obscure command which is, by default, on a sub-menu of remote control 20, and thus requires multiple keys to be depressed to access that command. In such a case, configuration utility 56 can prompt the user as to whether they would like that command to be placed on a soft key on a main menu, for easier access. If all the soft keys for that main menu are already in use, configuration utility 56 can prompt the user as to which other function assigned to a soft key the user would be willing to replace. In this latter case, analysis module 64 of configuration utility 56 can suggest to the user replacing the function assigned to a soft key which is least often used by the user; and (c) source-based patterns such as recognizing that the user typically employs the surround sound system for audio when viewing television programs on a particular channel, or range of channels (e.g., pay TV movie channels, etc.). In such a case, configuration utility 56 can prompt the user as to whether they would like the surround sound system to be the default audio system when viewing one of these channels and, if the user agrees, configuration utility 56 can modify the configuration data set accordingly so that the default audio system is the surround sound system when viewing one of the identified channels and is the television set's audio system when viewing other channels.

It is also contemplated that more sophisticated patterns can be recognized. For example, similar to the above-mentioned example regarding the use of the surround sound system or the television set's audio system when watching television programs, the analysis module 64 of configuration utility 56 can recognize that the user always uses the surround sound system to watch a television program on channel 5 between 9:00PM and 10:00PM on Tuesdays, but uses the television set's audio system at all other times.

In such a case, configuration utility 56 can prompt the user as to whether they would like remote control 20 to automatically switch to the surround sound system for viewing television programs on this channel at this time, but use the television set's audio system at all other times. If the user responds affirmatively, configuration utility 56 can appropriately amend the configuration data set and download the amended configuration data set to remote control 20 to obtain the desired functionality.

Similarly, it is contemplated that analysis module 64 can detect the absence of a previously noted pattern. For example, analysis module 64 can determine that the user has not watched the above-mentioned program on channel 5 on Tuesdays for several weeks and configuration utility 56 can prompt the user as to whether they would like to remove the previously added specific surround sound configuration for this channel. If the user responds affirmatively, then configuration utility 56 can create an appropriately amended configuration data set and download it to remote control 20 to remove this specific functionality.

While in each of the examples above, the user is prompted as to whether they desired a change to be made to the configuration of remote control 20, the present invention is not so limited and it is contemplated that changes which are deemed necessary or desired by configuration utility 56 can be effected without reference to the user.

It is further contemplated that the present invention can be employed to assist in the initial configuration and/or set up of remote control 20 and the consumer electronics devices and other devices to be controlled by remote control 20 and/or to troubleshoot problems which may occur during such set up and configuration. Specifically, as part of the initial configuration of remote control 20 to operate one or more of the devices of a user, an initial configuration data set is created and downloaded by configuration utility 56. Using remote control 20 with this initial configuration data set, the user can attempt to operate those devices.

If a problem occurs, or if an unexpected result is obtained, the user can press a "help" key (either a soft key or a dedicated key) on the remote. Once the help button has been pressed, remote control 20 can execute a troubleshooting routine included with the configuration data set wherein a series of prompts are displayed to the user and the user's responses, and any other the keys pressed by the user, are logged.

For example, the user may have a device, such as a television set, for which different command sets were employed by the manufacturer at different times. In such a case, the configuration utility can load a portion, in this example the "Power ON" command, of each of the multiple command sets from device database 54 into remote control 20, with one of the sets being selected for first use. The user can then be prompted by remote control 20 to use remote control 20 to turn the television set on with an appropriately identified soft key and remote control 20 will use the "Power ON" command from the first one of the possible command sets when that soft key is pressed.

Once the user has pressed the soft key on remote control 20 to turn the television set on, remote control 20 will display a prompt on display 32 asking the user if the set came on. If the user presses the key corresponding to "yes" in response to this prompt, remote control 20 will prompt the user to reconnect remote control 20 to network connection 48 and analysis module 64 will examine the log to determine the first command set is the required one and configuration utility 56 will create an appropriate configuration data set for remote control 20.

If the user presses a key corresponding "no" to indicate that the television set did not turn on, then remote control 20 can display a prompt on display 32 to have the user press another soft key to use the "Power ON" command from another possible command set to try to turn on the television set. The user is again prompted as to whether the desired result was obtained and the process can continue until the correct set is identified and remote control 20 is connected to configuration utility 56 to have the appropriate configuration data set constructed for it and downloaded into it.

As will be apparent, a wide range of other troubleshooting activities can be performed with remote control 20 through the combination of logging of events at remote control 20, providing appropriate prompts to the user via display 32 and recording responses from the user entered via keypad 28. For example, a user of remote control 20 may volunteer to verify that the information in device database 52 regarding one of the devices the user has is correct and complete. In a normal troubleshooting and/or installation process, configuration utility 56 will only use/exercise the actual functions and inputs that are relevant to the system the user has. For example, the user's television set may have a dedicated input for a satellite receiver, but the user does not have such a satellite receiver and thus the commands to operate that input are not included in the configuration data set executed by remote control 20.

In contrast, if the user volunteers to verify the data stored at data base 56 for his television set, configuration utility 56 can download a "full exercise" configuration data set which remote control 20 will use to test all of the features and functions of the television set. This "full exercise" configuration data set can be interactive, prompting the user as to whether particular functions and/or features have been properly set by remote control 20. Each response entered by the user is logged and stored for forwarding to the configuration utility 56, as described above and can be used by configuration utility 56 to alter the contents of device database 52 by either updating the data stored therein, or flagging the data as being suspect.

If the user indicates that a function or feature did not operate as expected, the "full exercise" configuration data set can have remote control 20 prompt the user to operate the OEM remote control that came with the television set to perform the function or feature that remote control 20 could not achieve. Remote control 20 can then capture, with command signal receiver 42, the command signals issued by the OEM remote to achieve the desired function or feature. The captured signals are then logged and stored and are forwarded to configuration utility 56 which can analyze the captured signals and add or replace them in device database 52. Similarly, device database 52 can have be missing one or more commands for a device and a configuration data set can be loaded into a remote control 20 of a user who has that device in order to have the user allow control signal receiver 42 to receive the missing commands from the OEM remote.

While the description above implies that analysis module 64 is located with configuration utility 56 and device database 52, it is contemplated that, if remote control 20 is connected to network 60 via a personal computer or other computing device, analysis module 64 can be located within such computing device for privacy concerns or any other reason. In such a case, the results of the analysis by analysis module 64 will be forwarded to configuration utility 56 via network 60, but the specific log data need not be.

Figure 3:
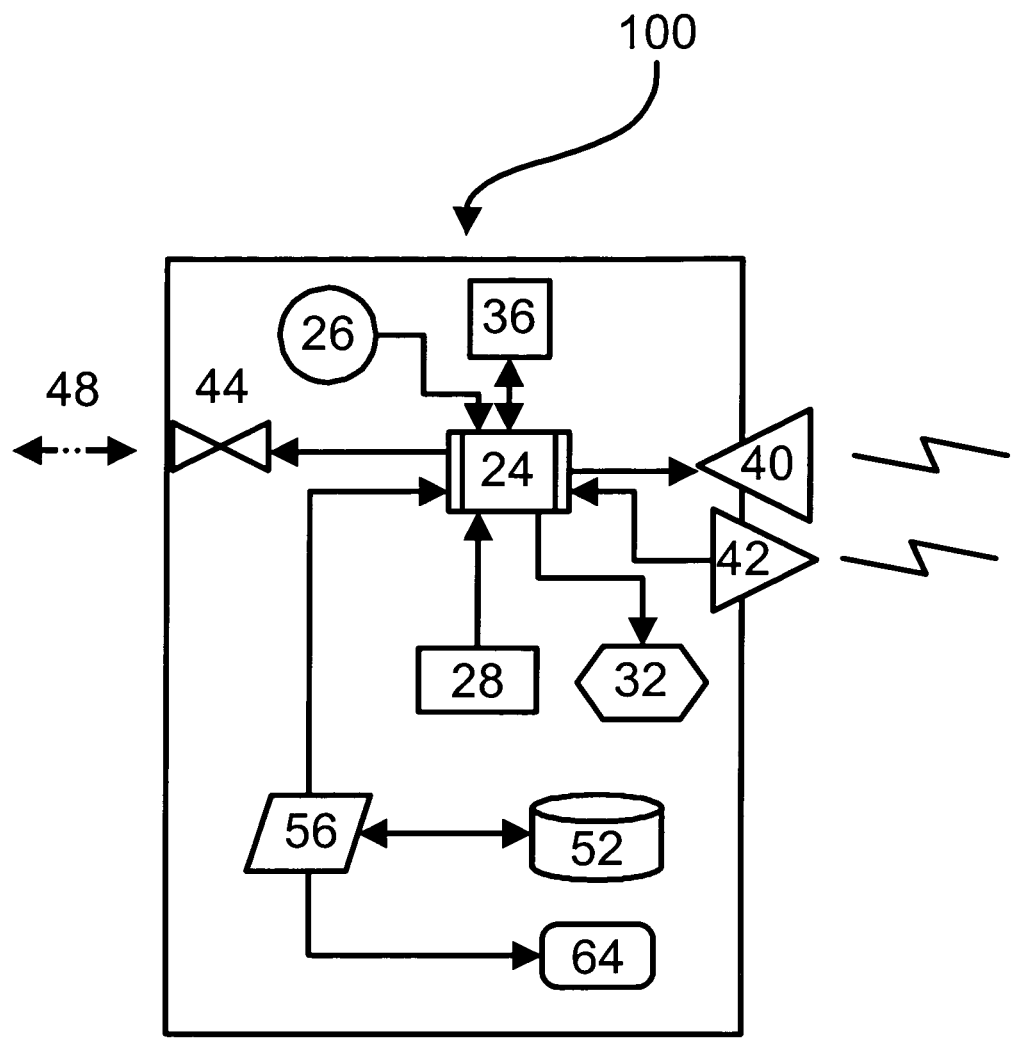
FIG. 3 is a schematic diagram of a remote control in accordance with another embodiment of present invention.

Another embodiment of a remote control in accordance the present invention is indicated generally at 100 in FIG. 3. In this Figure, like components to those shown in FIGS. 1 and 2 are indicated with like reference numbers. With remote control 20, described above, device database 52, configuration utility 56 and analysis module 64 are located at a remote location, where they can be used by a variety of remotes, principally to reduce the cost of manufacturing remote control 20, although other advantages can also be obtained. It is contemplated that, if manufacturing costs are not of overriding concern, these functions can be included within remote 100, as illustrated in FIG. 3.

In remote 100, device database 64 can be a non-volatile memory, such as Flash ROM, or can be a disc drive similar to those available for use in embedded devices, such as the Apple iPod™. Configuration utility 56 and analysis module 64 can be suitable programs executed by microprocessor 24. Remote 100 can still be equipped with a network interface controller 44 to connect to a network connection 48 and it is contemplated that network connection 48 can be used, from time to time, to update the contents of device database 52 and/or configuration utility 56 and analysis module 64 from a remote update source.

Figure 4:
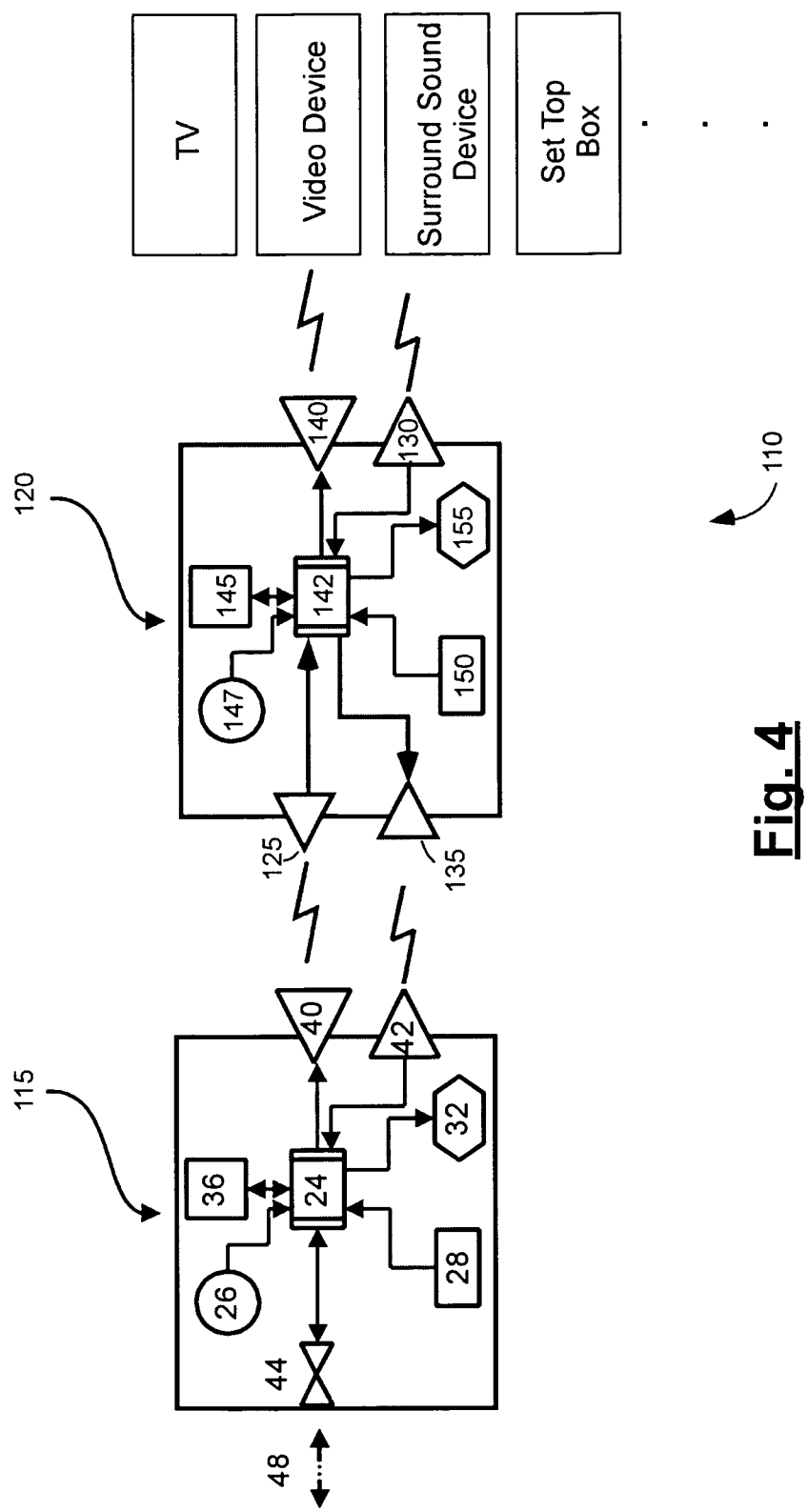
FIG. 4 is a schematic diagram of a remote control system that includes a first remote control and a second remote control in accordance with one embodiment of present invention.

FIG. 4 is a schematic diagram of a remote control system 110 in accordance with another embodiment of present invention. Remote control system 110 includes a first remote control 115 and a second remote control 120. Remote control 115 may be configured similarly to remote control 20 and/or remote control 100 described above in detail. Remote control 120 may be configured to receive remote control commands from remote control 115, and transmit the remote control commands to one or more devices to be controlled (e.g., TV, video recorder, video player, sound equipment, set top box, etc.).

To elaborate, remote control 120 may include a first receiver 125, a second receiver 130, a first transmitter 135, a second transmitter 140, a processor 142, and a memory 145. Remote control 120 may further include an internal power supply 147, or may be coupled to an external power supply (not shown). According to one embodiment, remote control 120 includes a keypad 150 and a display 155.

As discussed briefly above, the second remote control 120 is configured to receive a set of commands transmitted by the first remote control 115, and in turn transmit the set of commands to one or more devices to be controlled. A set as referred to herein includes one or more elements. The second remote control, via its first receiver 125, may be configured to receive the set of commands transmitted by the first remote control 115, and, via the second transmitter 140, transmit the set of commands to one or more devices to be controlled. The first receiver 125 may be an RF receiver, an IR receiver, an ultrasonic receiver or the like. The second transmitter 140 may be an RF transmitter, an IR transmitter, an ultrasonic transmitter or the like configured to operate according to a variety of transmission protocols, such as Home RF, Bluetooth, a proprietary transmission protocol or the like.

The second remote control's processor 142 may be configured to process the set of received commands in "real time" for transmission to the devices to be controlled, or the process may store the set of commands in memory 145 for processing and subsequent transfer. For example, the processor might be configured to process the set of received commands to change the format of these commands, e.g., from an IR format to an RF format or the like.

According to one embodiment, the second remote control is configured to receive, store, calculate, and/or update the operating states of the devices to be controlled. The second remote control may be configured to perform such operations in lieu of the first remote control performing such operations, or in addition to the first remote control performing such operations. The second remote control 120 may be receive, store, calculate, and/or update the states of the controlled devices similarly to remote control 20 and/or remote control 100 (described above in detail). For example, the second remote control 120 may be configured to receive state information for the devices to be controlled from a user who keys the states into second remote control via keypad 150. Alternatively, the second remote control may be configured to receive the operating state information from the devices to be controlled, for example, via the second receiver 130. The second receiver 130 may be configured to receive the state information in response to a polling request issued by the first and/or second remote control to the devices to be controlled. The polling request may be issued to the devices to be controlled at the request of a user via the first remote control or the second remote control (e.g., via keypad 150). Alternatively, the polling request may be issued at the initiation of one of the remote controls. For example, the polling request may be issued periodically (e.g., at 30 minute intervals thereafter, at 1 hour intervals thereafter or the like) by one of the remote controls. According to one embodiment, the second remote control might also be configured to receive the state information from the first remote control and/or provide state information to the first remote control. The second receiver 130 might be an IR receiver, an RF receiver, an ultrasonic receiver or the like. According to one embodiment, the first receiver and the second receiver may be a single receiver.

The second remote control may be configured to issue commands to the devices to be controlled based on the set of commands received from the first remote control and the states (e.g., stored in memory 145) of one or more devices to be controlled. The second remote control may be configured to operate similarly to remote control 20 and/or remote control 100 to control the devices to be controlled based on the states of these devices. Moreover, the second remote control may be configured to update and store the states of one or more devices to be controlled based on the state information previously stored in memory 145, and based on the commands transmitted from the second remote control to the devices to be controlled.

According to one embodiment, the second remote control may be configured to store one or more commands issued by the first remote control prior to transmitting the commands to the devices to be controlled. For example, if the first remote control transmits a number of controls signal associated with a macro, the second remote control may be configured to accumulate the commands in memory 145, and then determine a set of commands to transmit to the devices to be controlled based on the state information for these devices stored in memory. This is sometimes referred to in the art as "blasting" commands or sending a "burst" of commands (or simply a "burst"). As such, the second remote control is sometimes referred to as a "blaster" or a "blaster box." According to one embodiment, the first remote control is a handheld device and the second remote control is a blaster box, which might include a computing device, such as a personal computer, a set top box or the like.

Figure 5:
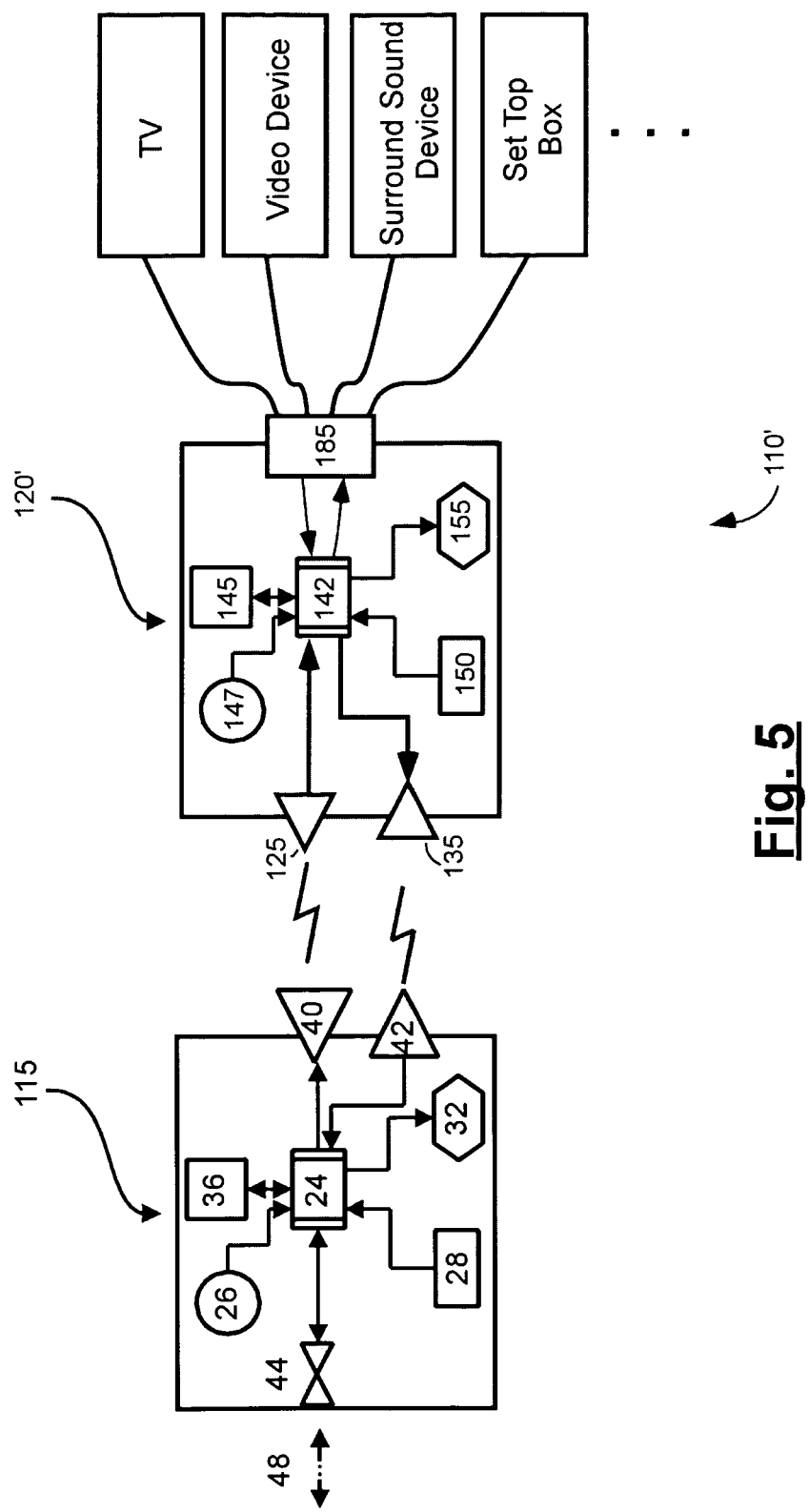
FIG. 5 is a schematic diagram of a remote control system that includes a first remote control and a second remote control in accordance with another embodiment of present invention.

FIG. 5 is a schematic diagram of a remote control system 110' in accordance with another embodiment of present invention. Remote control system 110' differs from remote control system 110 in that the second remote control 120' is configured to communicate with the devices to be controlled via a hardwire interface 185. Otherwise, remote control system 110' is configured to operate substantially similar to remote control system 110.

Figure 6:
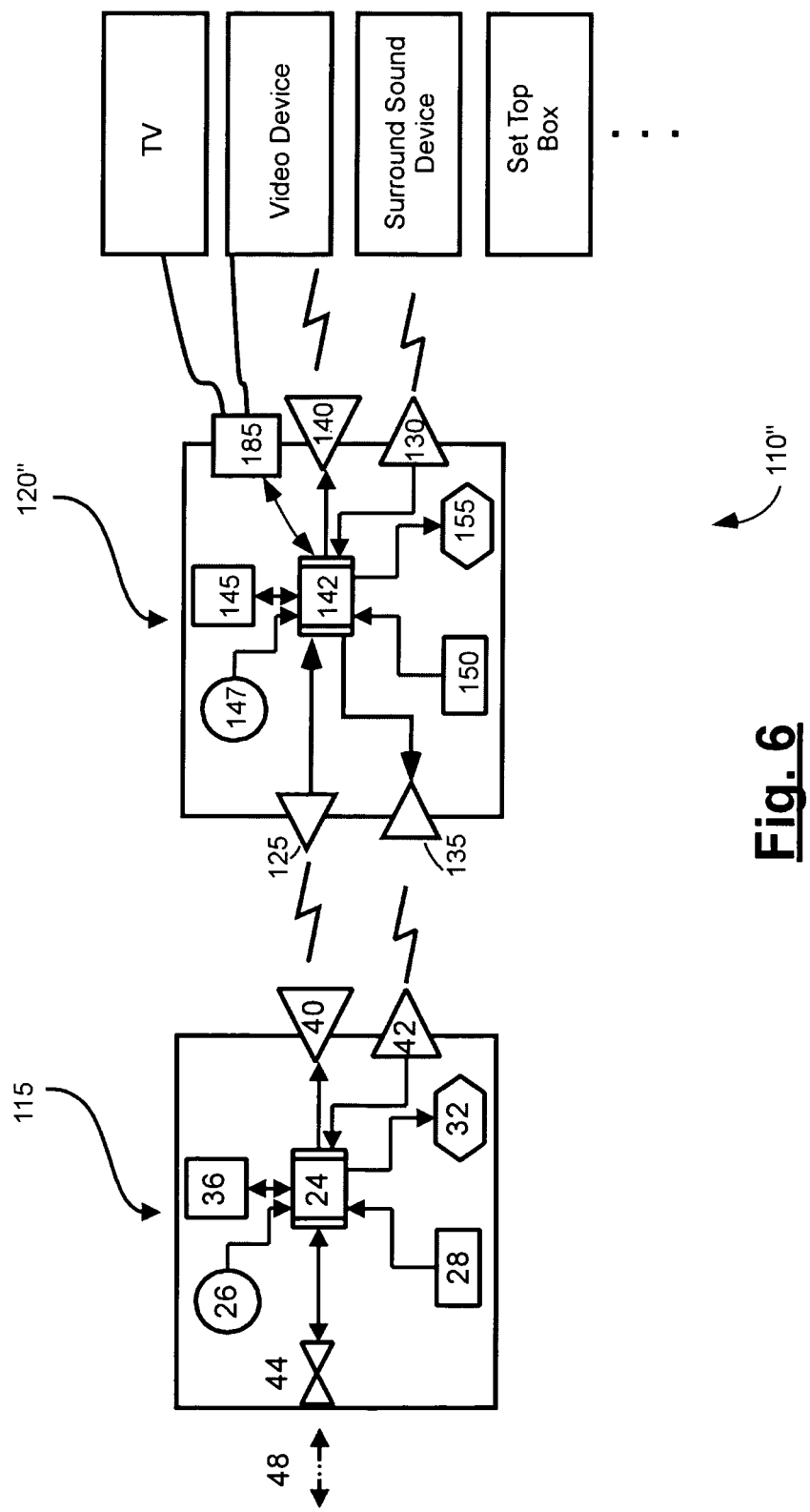
FIG. 6 is a schematic diagram of a remote control system that includes a first remote control and a second remote control in accordance with another embodiment of present invention.

FIG. 6 is a schematic diagram of a remote control system 110" in accordance with another embodiment of present invention. Remote control system 110" differs from remote control system 110 and 110' in that the second remote control 120" includes the second transmitter 140, the second receiver 140, and the hardwire interface 185. The second remote control may be configured to transmit commands and receive state information via one or both the second transmitter, the second receiver, and/or the hardwire interface. Otherwise, remote control system 110" is configured to operate substantially similar to remote control system 110.

Figure 7:
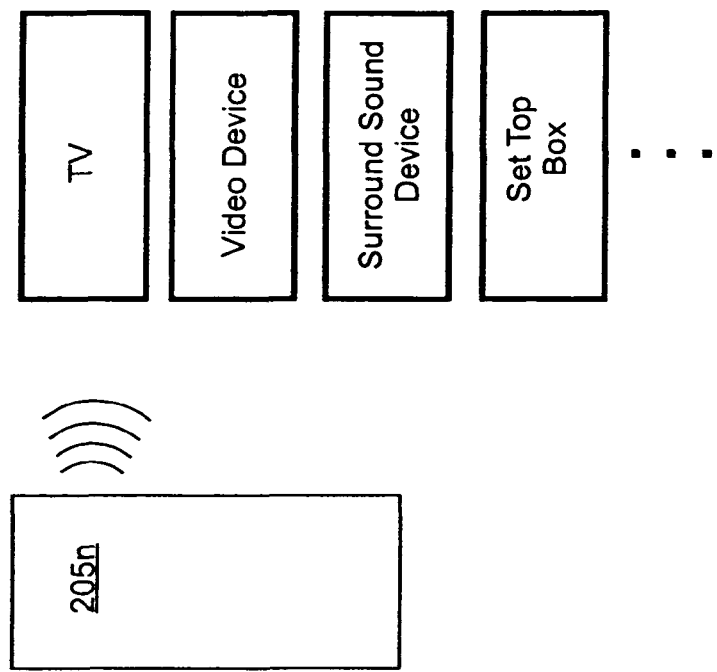
FIG. 7 is a schematic diagram of a remote control system according to another embodiment of the present invention.
Figure 7:
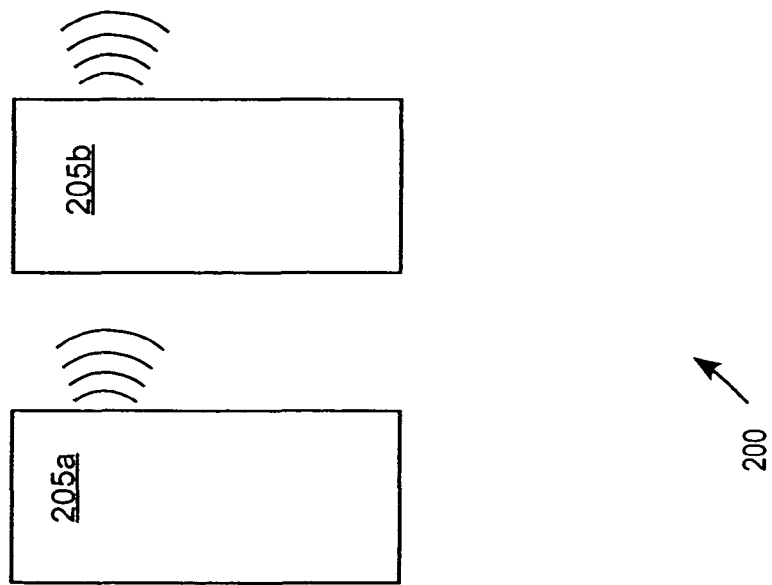

FIG. 7 is a schematic diagram of a remote control system 200 according to another embodiment of the present invention. Remote control system 200 includes a plurality of remote controls 205. The remote controls may be configured to transfer commands to and receive commands from each other and/or the one or more devices to be controlled. Alternatively, the remote controls may provide a control hierarchy wherein the first remote control 205a, transfers a command to a second remote control 205b, that transfers the command to another remote control (e.g., 205n) in the hierarchy that in turn transfers the command to one or more devices to be controlled. One or more of the remote controls may transmit a different command from the command received. For example, one or more of the remote control may be state based remote control that might transfer a different command from the command received based on the state information (described above). For example, the first remote control 205a might be a hand held remote control, computer (e.g., a web enabled PC) that is configured to transfer command to the second remote control 205b that might be a handheld remote control, an IR repeater, an RF repeater, an ultrasonic repeater, a light repeater, a computer (e.g., a web enabled PC), the blaster box or the like. The second remote control 205b might be configured to transfer the received command or another command (e.g., that is determined based on local state information) to a third remote control (e.g., remote control 205n) that in turn is configured to command one or more devices to be controlled. Alternatively, any of the devices in the hierarchy may be configured to transfer commands to another remote and to the devices to be controlled.

For example, the first remote control 205a might be a hand held remote control that is configured to transfer command to the second remote control 205b that might be an IR repeater, an RF repeater, an ultrasonic repeater, a light repeater, a computer, the blaster box or the like. According to an embodiment in which the second remote control is a computer, the second remote control may be configured to collect commands from one or more remotes and organize the commands in view of resident information (e.g., state information for the devices to be controlled) and issue one or more commands to the third remote control. The third remote control might be the blaster box (described above) or might include a plurality of blaster boxes configured to control the devices.

Embodiments of the present invention provides a method and system for adaptively configuring a remote control. The system and method can analyze a log of events, maintained by the remote, which indicates how the remote and the devices it controls are used by a user and can then suggest alternative configurations of the remote to the user. The range and type of alternative configurations is not particularly limited and can include changing which devices are employed for various user activities and/or how those activities are performed, the placement and hierarchy of commands in a menu tree and/or troubleshooting and set up configurations.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A remote control system comprising:
    a remote control operable to log and store user initiated events relating to the control of devices with the remote control, the remote control operating in accordance with a configuration data set stored in the remote control;
    a device database storing identifications of devices to be controlled by the remote control and the command sets for those devices;
    an analysis module operable to analyze the log of events stored by the remote control to identify one or more patterns of interest in the logged use of the remote control by the user; and
    a configuration utility operable with the device database and the analysis module to create a configuration data set to operate the remote control in accordance with at least one identified pattern of interest.

2. The remote control system of claim 1 where, in response to the results produced by the analysis module, the configuration utility conducts an interactive dialog with the user as to whether they would like a suggested change in the operation of the remote control to be implemented and the configuration utility will only effect the change if the user responds accordingly.

3. The remote control of claim 2 wherein the remote control is operable to connect to a network and wherein the device database is located at a location to which the remote control connects through the network.

4. The remote control of claim 3 wherein the configuration utility and the analysis module are located at a location to which the remote control connects through the network.

5. The remote control system of claim 4 wherein the interactive dialog with the user is effected via a web page displayed to the user.

6. The remote control system of claim 2 wherein the interactive dialog with the user is effected via the display and keypad of the remote control.

7. The remote control system of claim 1 wherein the patterns of interest result from logged and stored events from a troubleshooting program previously loaded into the remote control and the configuration utility is responsive to one or more identified patterns of interest to change the configuration data set of the remote control to correct an identified error in a previous version of the configuration data set.

8. The remote control of claim 1 wherein the configuration utility and the analysis module are located in the remote control.

9. The remote control system of claim 1, wherein the device database is located in the remote control.

10. The remote control system of claim 9, wherein the configuration utility and the analysis module are located in the remote control.

11. The remote control system of claim 1, wherein the configuration data set created by the configuration utility is configured to be stored in the device database, and is configured to be available via the device database to a plurality of remote controls operated by a plurality of users.

12. The remote control system of claim 1, wherein the log is configured to be stored in the device database, and is configured to be available via the device database to a plurality of remote controls operated by a plurality of users.

13. A method of adaptively configuring a remote control to operate at least one device, comprising the steps of:
    (i) identifying to a configuration utility the at least one device to be controlled by the remote control;
    (ii) retrieving from a database of command sets for devices, the command set and capabilities of the identified at least one device;
    (iii) creating a configuration data set for operating the remote control to control the device using the retrieved command set and transferring that configuration data set to the remote control;
    (iv) using the remote control to operate the at least one device and storing a log of each event relating to the control of the device;
    (v) at intervals, analyzing the stored log of events to identify at least one pattern of interest indicating how the user of the remote control operates the device;
    (vi) altering the configuration data set in response to the at least one identified pattern of interest; and
    (vii) downloading the altered configuration data set to the remote control to alter how the remote control operates the at least one device.

14. The method of claim 13 further comprising the step of, prior to altering the configuration of the configuration data set, prompting the user as to whether they desire the identified change to be made and only effecting the alteration of the configuration data set if the user indicates their acceptance of the change.

15. The method of claim 13 wherein steps (iv) through (vii) are re-performed at intervals.

16. The method of claim 13, further comprising, storing the created configuration data set in the device database, wherein the created configuration data set is configured to be available via the device database to a plurality of remote controls operated by a plurality of users.

17. The method of claim 13, further comprising, storing the log in the device database, wherein the log is configured to be available via the device database to a plurality of remote controls operated by a plurality of users.

18. The method of claim 13, wherein the step of altering the configuration data set comprises:
    sending the at least one pattern of interest to the device database; and
    providing an altered configuration database from the device database to the remote control.

19. A remote control system comprising:
    first and second remote controls, wherein the first remote control and/or the second remote control is configured to log and store information for user initiated events relating to commands transmitted from the first remote control to the second remote control, and the first remote control and second remote control are configured to operate in accordance with configuration data stored in these remote controls;
    a device database configured to store identifications of devices to be controlled by the remote controls and the command sets for those devices;
    an analysis module configured to analyze the log of user initiated events to identify one or more patterns of use in the log of use initiated events; and
    a configuration utility operable with the device database and the analysis module to create a configuration data set to operate the first remote control and the second remote control in accordance with at least one identified pattern of interest.

20. A method for configuring a first remote control and a second remote control to operate a set of electronic devices, comprising the steps of:
    identifying to a configuration utility the set of electronic devices configured to be controlled by the first and second remote control;
    retrieving from a database of command sets a command set for the set of electronic devices;
    transmitting from the first remote control to the second remote control a set of commands included the retrieved command set;
    storing in the first remote control and/or the second remote control a log of commands issued by the first remote control and/or the second remote control;
    at select intervals, analyzing the log of commands to identify at least one pattern of use of the first remote control and/or the second remote control;
    altering the command set in response to the at least one identified pattern of use; and
    transmitting the altered command set to the first remote control and/or the second remote control to alter how these remote controls operate the set of devices.

21. The method of claim 20 further comprising:
    requesting the user to indicate whether the user wants the first remote control and/or the second remote control to receive and use the altered command set; and
    effecting use of the altered command set in the first remote control and/or the second remote control if the user indicates acceptance of the request.

22. The method of claim 20, further comprising, storing the altered command set in the device database, wherein the altered command set is configured to be available via the device database to a plurality of remote controls operated by a plurality of users.

23. The method of claim 20, further comprising, storing the log in the device database, wherein the log is configured to be available via the device database to a plurality of remote controls operated by a plurality of users.

24. A remote control comprising:
a processor configured to operate in accordance with a configuration data set to control a set of devices, and to generate a log of user-initiated events, which are for the control of a set of devices;
a memory coupled to the processor and configured to store the log of user-initiated events; and
an analysis module coupled to the processor and the memory, and configured to analyze the log of user-initiated events stored in the memory for one or more patterns of interest, wherein the processor is configured to execute a configuration utility operable to create an amended configuration data set, which include commands for the remote control to execute the pattern of interest to control the set of devices.

25. The remote control of claim 24, further comprising a device database configured to store command sets for the set of devices, wherein the configuration utility is configured to retrieve the commands sets from the device database to generate the amended configuration data set.

26. The remote control of claim 24, further comprising communicating with a device database configured to store command sets for the set of devices, wherein the configuration utility is configured to retrieve the commands sets from the database to generate the amended configuration data set, and wherein the device database is configured to be at location at which the processor connects to the device database through a network.

27. The remote control of claim 24, wherein the pattern of interest includes a time-based pattern, a use-based pattern, or a source-based pattern.

28. The remote control of claim 24, wherein the amended configuration data set is configured for use by the processor to display a soft button on a display of the remote control, and wherein activation of the soft button causes the processor to execute the pattern of interest to control the set of devices.

29. The remote control of claim 28, wherein the soft button is for a button in a sub-menu, and the soft button is in a main menu.

30. The remote control of claim 24, wherein the device database is configured to store the amended configuration data set, which is configured to be available via the device database to a plurality of remote controls operated by a plurality of users.

31. The remote control of claim 24, wherein the device database is configured to store the log, which is configured to be available via the device database to a plurality of remote controls operated by a plurality of users.

32. A remote control system comprising:
a remote control configured to operate in accordance with a configuration data set to control a set of devices, and to generate a log of user-initiated events, which are for the control of a set of devices;
a memory module configured to store the log of user-initiated events;
an analysis module configured to receive the log of user-initiated events and analyze the log of user-initiated events for a pattern of interest;
a configuration utility operable to create an amended configuration data set based on the pattern of interest, wherein the amended configuration data set includes commands for the remote control to execute the pattern of interest to control the set of devices.

33. The remote control system of claim 32, further comprising a database configured to store identifications for the set of devices and the command sets for the set of devices, wherein the configuration utility is configured to retrieve the commands sets from the device database to generate the amended configuration data set.

34. The remote control system of claim 33, wherein the device database is configured to be at location at which the remote control connects to the device database through a network.

35. The remote control system of claim 32, wherein the analysis module and the configuration utility are included in the remote control.

36. The remote control system of claim 32, wherein the pattern of interest includes a time-based pattern, a use-based pattern, or a source-based pattern.

37. The remote control system of claim 32, wherein the amended configuration data set is configured for use by the remote control to display a soft button on a display of the remote control, and wherein activation of the soft button causes the remote control to execute the pattern of interest to control the set of devices.

38. The remote control system of claim 37, wherein the soft button is for a button in a sub-menu, and the soft button is in a main menu displayed on the display.

39. The remote control system of claim 32, wherein the device database is configured to store the amended configuration data set, which is configured to be available via the device database to a plurality of remote controls operated by a plurality of users.

40. The remote control system of claim 32, wherein the device database is configured to store the log, which is configured to be available via the device database to a plurality of remote controls operated by a plurality of users.

* * * * *